US008688774B2

(12) United States Patent
Isidore

(10) Patent No.: US 8,688,774 B2
(45) Date of Patent: Apr. 1, 2014

(54) METHOD, SYSTEM, AND DEVICES FOR FACILITATING REAL-TIME SOCIAL AND BUSINESS INTERACTIONS/NETWORKING

(76) Inventor: Eustace Prince Isidore, Austin, TX (US)

( * ) Notice: Subject to any disclaimer, the term of this patent is extended or adjusted under 35 U.S.C. 154(b) by 484 days.

(21) Appl. No.: 12/852,996

(22) Filed: Aug. 9, 2010

(65) Prior Publication Data

US 2012/0036181 A1 Feb. 9, 2012

(51) Int. Cl.
*G06F 15/16* (2006.01)
*G06F 15/173* (2006.01)

(52) U.S. Cl.
USPC ........... 709/203; 709/204; 709/228; 709/237; 705/319

(58) Field of Classification Search
USPC .................................................. 709/203, 237
See application file for complete search history.

(56) References Cited

U.S. PATENT DOCUMENTS

| | | | |
|---|---|---|---|
| 7,890,581 B2* | 2/2011 | Rao et al. ....................... 709/204 |
| 7,930,731 B2* | 4/2011 | Glasgow ........................... 726/3 |
| 7,991,895 B2* | 8/2011 | Leppisaari et al. ............ 709/227 |
| 8,014,763 B2* | 9/2011 | Hymes ........................ 455/414.2 |
| 8,023,929 B2* | 9/2011 | Mgrdechian et al. ...... 455/414.1 |
| 8,077,849 B2* | 12/2011 | Altberg et al. ............ 379/201.01 |
| 8,082,154 B2* | 12/2011 | Novack et al. ................. 704/273 |
| 8,135,800 B1* | 3/2012 | Walsh et al. ................... 709/217 |
| 8,150,416 B2* | 4/2012 | Ribaudo et al. ............. 455/456.1 |
| 8,208,943 B2* | 6/2012 | Petersen et al. ............. 455/456.1 |
| 8,260,882 B2* | 9/2012 | Kim et al. ...................... 709/218 |
| 8,295,465 B2* | 10/2012 | Altberg et al. ............ 379/216.01 |
| 8,321,509 B2* | 11/2012 | Jennings et al. ............... 709/204 |
| 8,386,620 B2* | 2/2013 | Chatterjee ...................... 709/228 |
| 8,396,665 B2* | 3/2013 | Siereveld et al. ............. 701/533 |
| 2008/0215623 A1* | 9/2008 | Ramer et al. ................ 707/104.1 |
| 2008/0249863 A1* | 10/2008 | Redmond ........................ 705/14 |
| 2009/0080635 A1* | 3/2009 | Altberg et al. ............ 379/216.01 |
| 2010/0005520 A1* | 1/2010 | Abbot et al. ...................... 726/6 |
| 2010/0069035 A1* | 3/2010 | Johnson ..................... 455/404.1 |
| 2010/0144318 A1* | 6/2010 | Cable ......................... 455/412.1 |
| 2010/0278345 A1* | 11/2010 | Alsina et al. ................... 380/283 |
| 2010/0280904 A1* | 11/2010 | Ahuja ........................ 705/14.58 |
| 2010/0281113 A1* | 11/2010 | Laine et al. .................... 709/204 |
| 2010/0306708 A1* | 12/2010 | Trenz et al. .................... 715/853 |
| 2011/0113084 A1* | 5/2011 | Ramnani ....................... 709/201 |
| 2011/0196724 A1* | 8/2011 | Fenton et al. .............. 705/14.16 |
| 2011/0270923 A1* | 11/2011 | Jones et al. .................... 709/204 |
| 2011/0320536 A1* | 12/2011 | Lobb et al. ..................... 709/205 |
| 2012/0019365 A1* | 1/2012 | Tuikka et al. ................. 340/10.1 |
| 2012/0158531 A1* | 6/2012 | Dion et al. .................... 705/26.1 |
| 2012/0239742 A1* | 9/2012 | Moradi et al. ................. 709/204 |

\* cited by examiner

*Primary Examiner* — Melvin H Pollack
(74) *Attorney, Agent, or Firm* — Isidore PLLC

(57) ABSTRACT

A personal networking/communication device (PND) enables real-time social and business interactions/networking within a real environment. A first PND associated with a first person/user in the real environment is within communication range of a second PND. The first PND receives (via electronic communication) and displays a social interaction information signature (SIS) of the second PND. The signature includes a physical mapping/location of the second PND relative to the first PND and provides some information about the second PND's user. Following a selection of the SIS on the first PND, the first PND electronically transmits one or more "request for interaction or information exchange" (RIIE) to the second PND. When the first PND receives a response to the RIIE from the second PND, the user of the first PND receives real-time unequivocal confirmation of whether the second person is interested in interacting/socializing with the user.

31 Claims, 10 Drawing Sheets

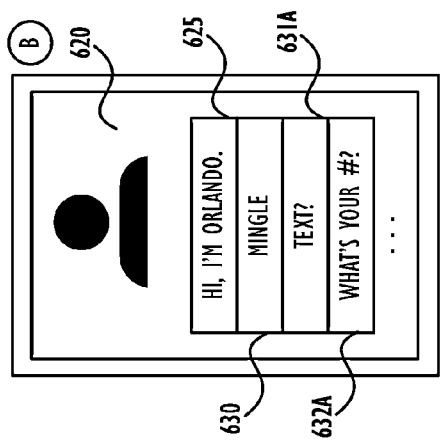
FIG. 6
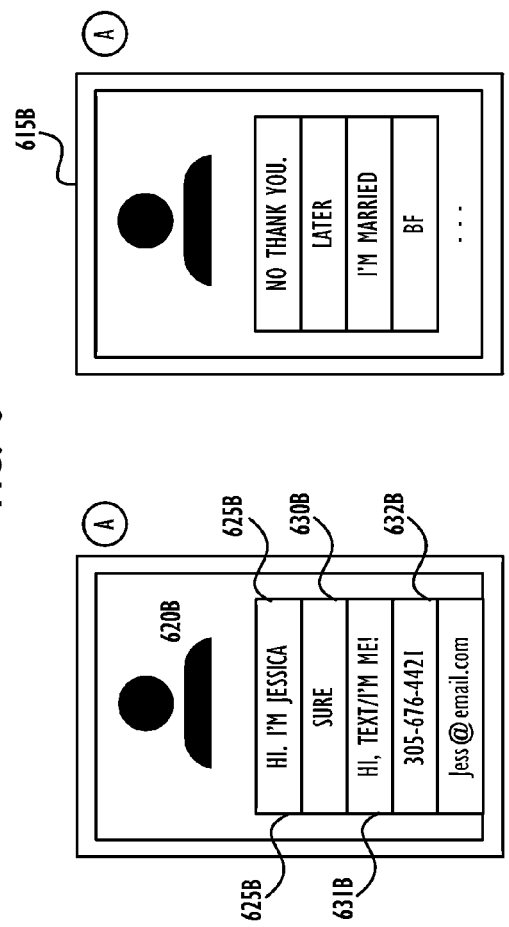
FIG. 10A
FIG. 10B

US 8,688,774 B2

METHOD, SYSTEM, AND DEVICES FOR FACILITATING REAL-TIME SOCIAL AND BUSINESS INTERACTIONS/NETWORKING

BACKGROUND OF THE INVENTION

1. Field of the Invention

Embodiments of the present invention relates generally to communication methods and devices and in particular to electronic communication methods and devices. Still more particularly, embodiments of the present invention relate to electronic communication devices and methods of using those devices to promote social interaction and networking.

2. Description of the Related Art

As social beings, people often look for ways to interact with each other, and such social interactions were traditionally conducted in person or over the telephone. As people become more and more busy with their daily routine of work and family and personal life, many people have sought out other means to interact socially. With the onset of the Internet and the large number of people who spend time on this medium of information sharing and communication, a large number of people have been drawn to the online social sites to engage in their social networking. This social networking phenomenon is becoming more and more mainstream and has in many instances replaced the person to person interaction that occurs in the real world with this made up persona interacting on the virtual social networking world.

With the proliferation of the Internet, many people now become members of these social networking sites and then search for new "friendships" within an online setting. Online social networking, however, has no direct, "real life" personal interaction other than the images and sounds posted on a website or webpage with information about a person or an occasional online chat session between two persons. Social networking sites oftentimes provide only a superficial feel for the other person with whom one is interacting. These individuals exchange a large amount of personal information based on an online profile, without having met the other person and determine if that other person is someone they even want to provide such detailed personal information to. These individuals are then left to later arrange to meet at a public place to see whether the online banter or exchange is with someone they are truly interested in.

Thus, despite the growth of these online social networking services, the majority of people still desire/prefer to interact/ network in person with others, particularly with others of interest to them. Social establishments, such as clubs, bars, movie theatres, malls, etc., are frequently by a large segment of these individuals, most of whom are "looking" to meet other people of similar interest, whether for development of plutonic, social or business contacts, or for a potential romantic connection. These social establishments provide an opportunity to meet other people in a real-life social (or business) setting.

Unlike with the online networking sites, people who frequent these public (or private) establishments are not able to pre-screen those people with whom they come into contact with or who may approach them to chat, dance, or connect in some way. Thus, it is not uncommon for individuals in these establishments to have unwanted interactions and/or be approached by individuals who are not of interest to them. Additionally, in some instances, some of these individuals in these social establishments are not really interested in interacting with new people, as in the cases where a group of women go for a "girls night out" to interact solely among themselves or a married person goes out just to enjoy the atmosphere within the social establishment.

Many people view these social establishments as providing an opportunity to meet/hook-up/network with another person (s). However, because the person initiating the interaction (the "initiator") typically has little knowledge of the person being approached (the "target"), situations frequently arises, where the initiator is met with personality checks, outright rejection, or being ignored or rebuffed by the target (where the initiator does not fit within the target's idea of the type of initiator that the target is desirous of (or interested in) interacting with. Within these social establishments, some individuals may blunder along looking for someone that would be receptive to their approach, while others patiently wait hoping that someone of interest actually approaches them. Incorrect assumptions, rejections, and the like have always been a part of this traditional social networking.

Even in a business networking environment, it is not oncoming for individuals to invest significant amounts of networking capital interacting with the wrong people at a business function (such as a conference or business meeting) before the person realizes that they have potentially "spent" significant time developing contacts that offer little benefit to them. These persons are occasionally made aware at some later time (after the event/function has ended) that there were other persons at the same event/function who would have been an important business contact to meet or with whom their networking capital would have been better spent.

SUMMARY OF THE CLAIMED SUBJECT MATTER

The disclosed embodiments provide a personal networking/communication device (PND) and a method, system and computer program product executing within an electronic communication/computing device for enabling real-time social and business interactions/networking within a real environment. A first PND associated with a first person in the real environment is within communication range of a second PND associated with a second person). The first PND receives (via electronic communication means) and displays a signature, e.g., a social interaction information signature (SIS) corresponding to the second PND. The signature includes a physical mapping/location of the second PND relative to the first PND and provides some information about the second person. On receipt of a selection (by a user of the first PND) of the second person's signature, the first PND electronically transmits one or more "request for interaction or information exchange" (RIIE or RIE) (e.g., a "tingle") to the second PND. When the second PND is an active PND (i.e., one that is capable of two way communication, in addition to transmitting/receiving a RIIE), the second person is able to directly respond to the tingle with one of multiple possible responses available via the second PND. When the first PND receives a response (e.g., "mingle") from the second PND, the first person having the first PND receives real-time unequivocal confirmation of whether the second person is interested in interacting/socializing with the first person.

In one embodiment, a request for information exchange (RIE) (e.g., a "tickle") may be transmitted from the first PND requesting passive (not in person) communication with the second person, enabling the second person to respond by utilizing the second PND to initiate direct localized texting or information exchange with the first PND. In one embodiment, a localize text signal/information exchange (LTSE) protocol enables this direct localized texting or information exchange. In another embodiment, the information transmitted from the PND of either party may be first downloaded from a network site/server via a network connection mechanism provided on the PND and/or a wireless network access point/connection available within the local real environment. In yet another embodiment, the information may be directly entered on the PND, via one or more input mechanisms available on/to the PND. In other implementations, a specialized electronic component, such as a memory chip, ASIC, or SD RAM, is provided. This electronic component may be pre-programmed with the user information and then inserted into a receiving port/slot in the PND or held within an article of clothing or jewelry or a wallet or a purse, to enable exchange of the user information with PNDs within the social environment.

In one embodiment, the PND is a uni-directional "passive" device that only transmits the preprogrammed information about the second person via the SIS, which information can then be received and displayed on the first person's PND within the social environment. In another embodiment, the RIIE transmitted includes identifying information, such as a picture and/or name, of the first person. In yet another embodiment, the response may provide for instantaneous texting or opening a chat session between devices via LTSE protocol. In yet another embodiment, the response may block the signature of the second person's PND from continuing to be viewable on the first person's PND.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The following description of the illustrative embodiments of the invention are described with reference to the drawings, in which like numbers represent the same or similar elements, as follows:

FIG. 6 is a block diagram illustrating an example display of a second PND that has received a SIIS request (or request for interaction/information exchange, RIE) from a first PND, in accordance with one embodiment;

FIG. 10A-10B illustrates example responses provided on the display of a PND of the person who generated the SIIS/RIE, according to one or more embodiments.

DETAILED DESCRIPTION OF ILLUSTRATIVE EMBODIMENTS

Figure 1:
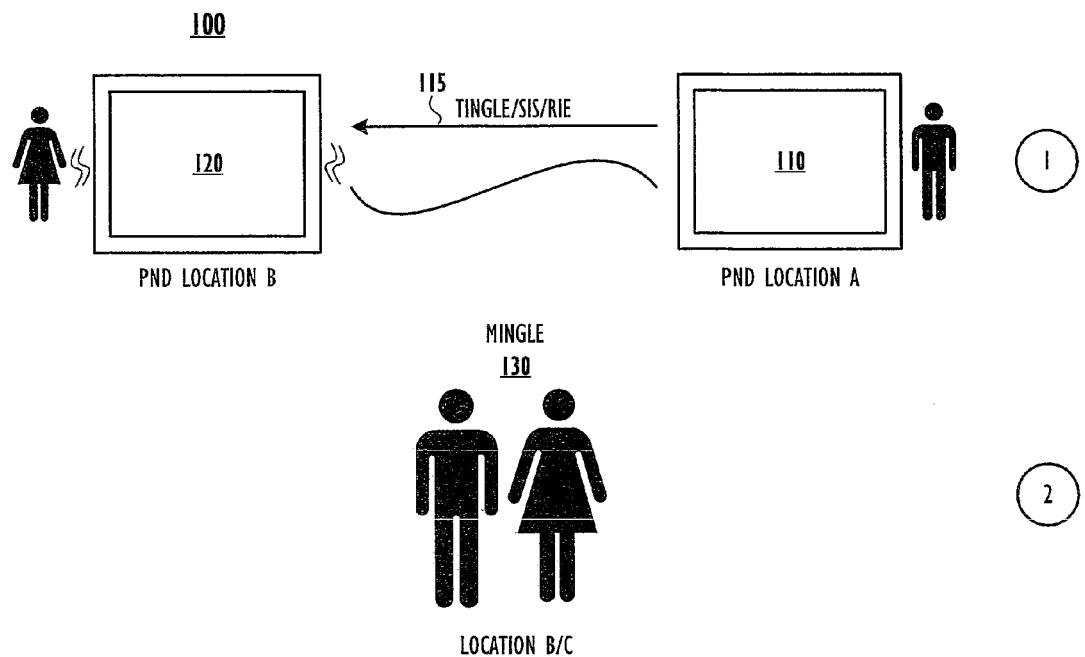
FIG. 1 illustrates a social networking scheme involving use of a personal networking device (PND) to initiate a request for a social interaction between two individuals followed by the in-person interaction of the two individuals, according to one embodiment of the invention.

Generally, the illustrative and described embodiments provide a personal networking/communication device (PND) and a method, system and computer program product executing within an electronic communication/computing device for enabling real-time social and business interactions/networking within a real environment. A first PND associated with a first person in the real environment is within communication range of a second PND associated with a second person). The first PND receives (via electronic communication means) and displays a signature, e.g., a social interaction information signature (SIS) corresponding to the second PND. The signature includes a physical mapping/location of the second PND relative to the first PND and provides some information about the second person. On receipt of a selection (by a user of the first PND) of the second person's signature, the first PND electronically transmits one or more "request for interaction or information exchange" (RIIE or RIE) (e.g., a "tingle") or a social interaction information signal (SIS) to the second PND. When the second PND is an active PND (i.e., one that is capable of two way message communication, in addition to transmitting/receiving a RIE/SIS), the second person is able to directly respond to the tingle with one of multiple possible responses available via the second PND. When the first PND receives a response (e.g., "mingle") from the second PND, the first person having the first PND receives real-time unequivocal confirmation of whether the second person is interested in interacting with the first person.

In one embodiment, a request for information exchange (RIE) (e.g., a "tickle") may be transmitted from the first PND requesting passive (not in person) communication with the second person, enabling the second person to respond by utilizing the second PND to initiate direct localized texting or information exchange with the first PND. In one embodiment, a localize text signal/information exchange (LTSE) protocol enables this direct localized texting or information exchange. In another embodiment, the information transmitted from the PND of either party may be first downloaded from a network site/server via a network connection mechanism provided on the PND and/or a wireless network access point/connection available within the local real environment. In yet another embodiment, the information may be directly entered on the PND, via one or more input mechanisms available on/to the PND. In other implementations, a specialized electronic component, such as a memory chip, ASIC, or SD RAM, is provided. This electronic component may be pre-programmed with the user information and then inserted into a receiving port/slot in the PND or held within an article of clothing or jewelry or a wallet or a purse, to enable exchange of the user information with PNDs within the social environment.

In one embodiment, the PND is a uni-directional "passive" device that only transmits the preprogrammed information about the second person via the SIS, which information can then be received and displayed on the first person's PND within the social environment. In another embodiment, the RIIE transmitted includes identifying information, such as a picture and/or name, of the first person. In yet another embodiment, the response may provide for instantaneous texting or opening a chat session between devices via LTSE protocol. In yet another embodiment, the response may block the signature of the second person's PND from continuing to be viewable on the first person's PND, and the SIS then fades from view or is shown "Xed out" on the first PND.

Figure 2B:
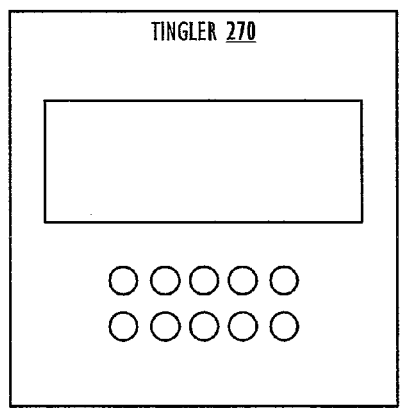
FIG. 2B illustrates an example passive PND, by which a pre-programmed user signature is transmitted for receipt within the social environment by active PNDs (having both receive and transmit functionality), such as the PND of FIG. 2A, in accordance with one embodiment.
Figure 2A:
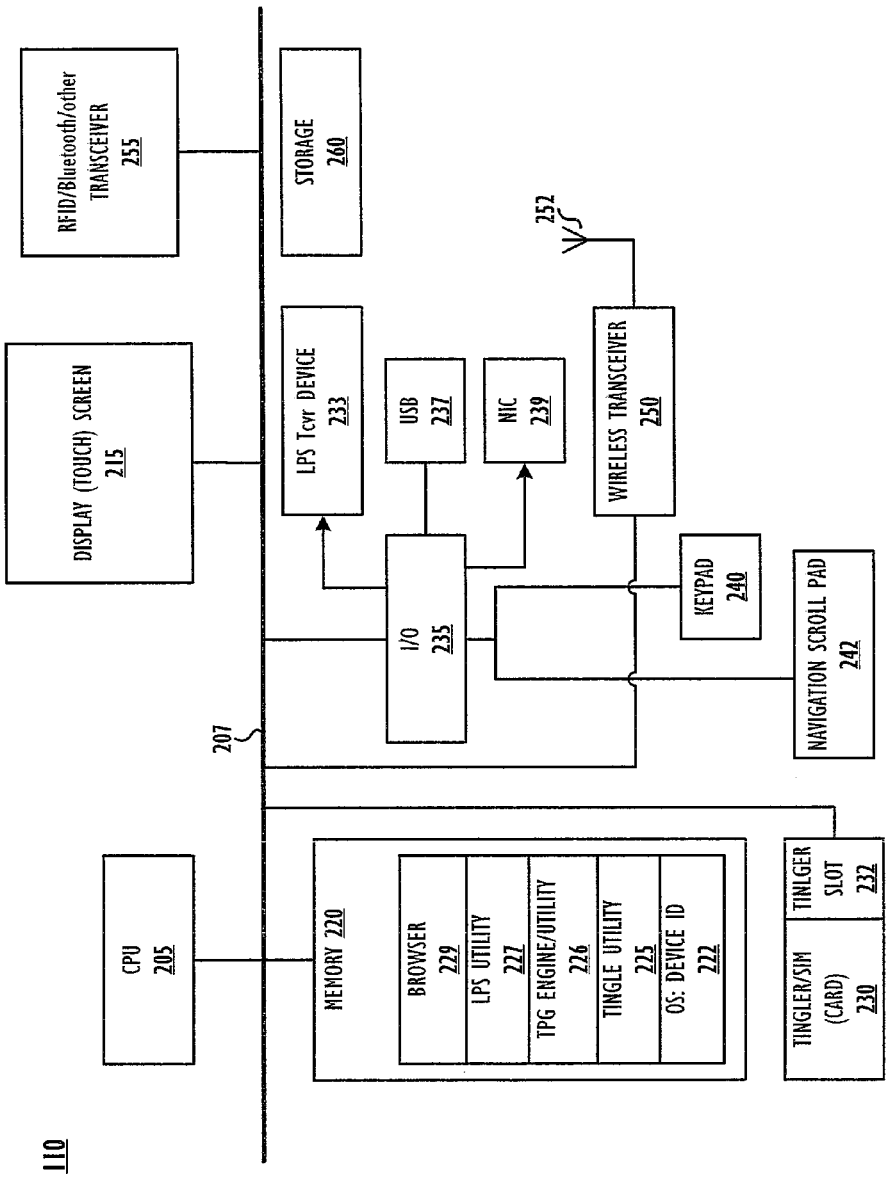
FIG. 2A illustrates an example PND, configured with wireless communication mechanisms/protocols, including localize text signal exchange (LTSE) transceiver devices, according to one embodiment.
Figure 3:
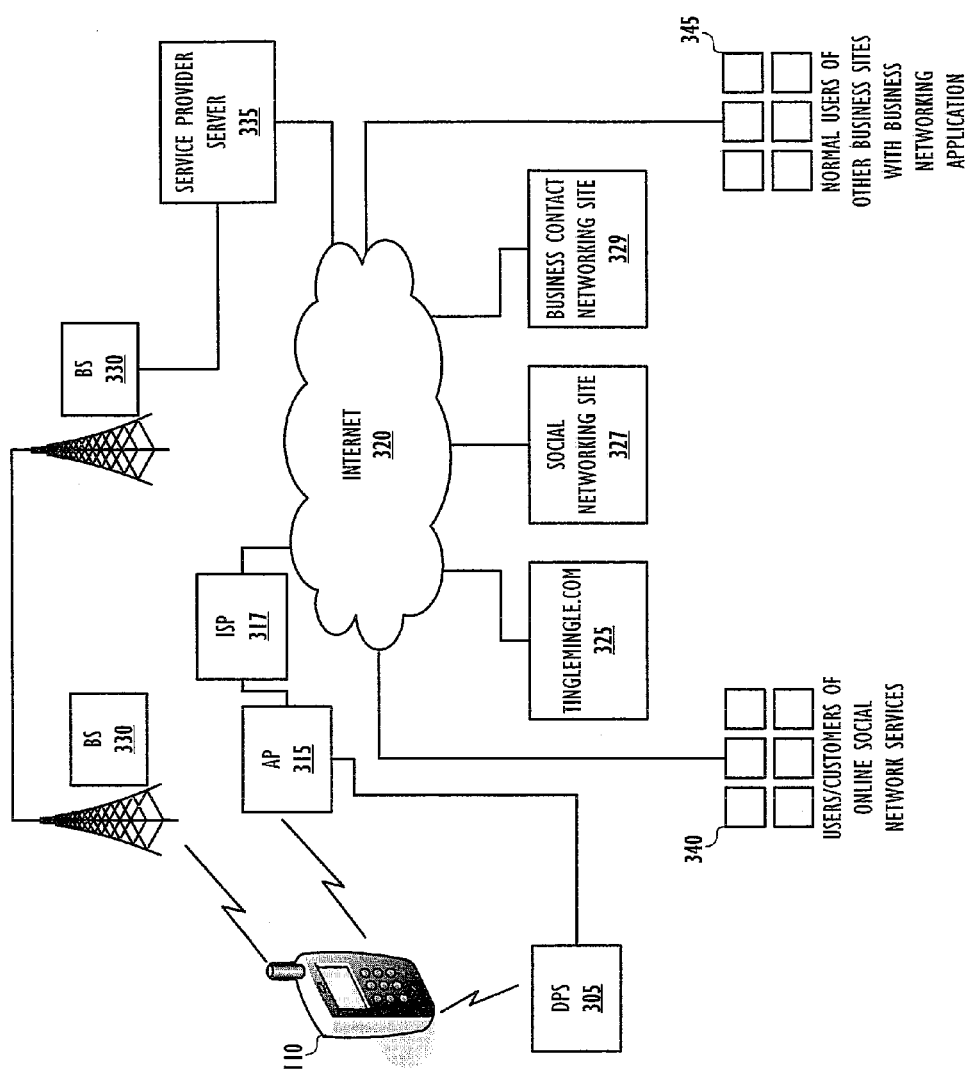
FIG. 3 provides an example network, illustrating different paths of connectivity between a PND and various social networking sites and business networking sites having a plurality of users/subscribers connected via the Internet, in accordance with described embodiments.
Figure 4:
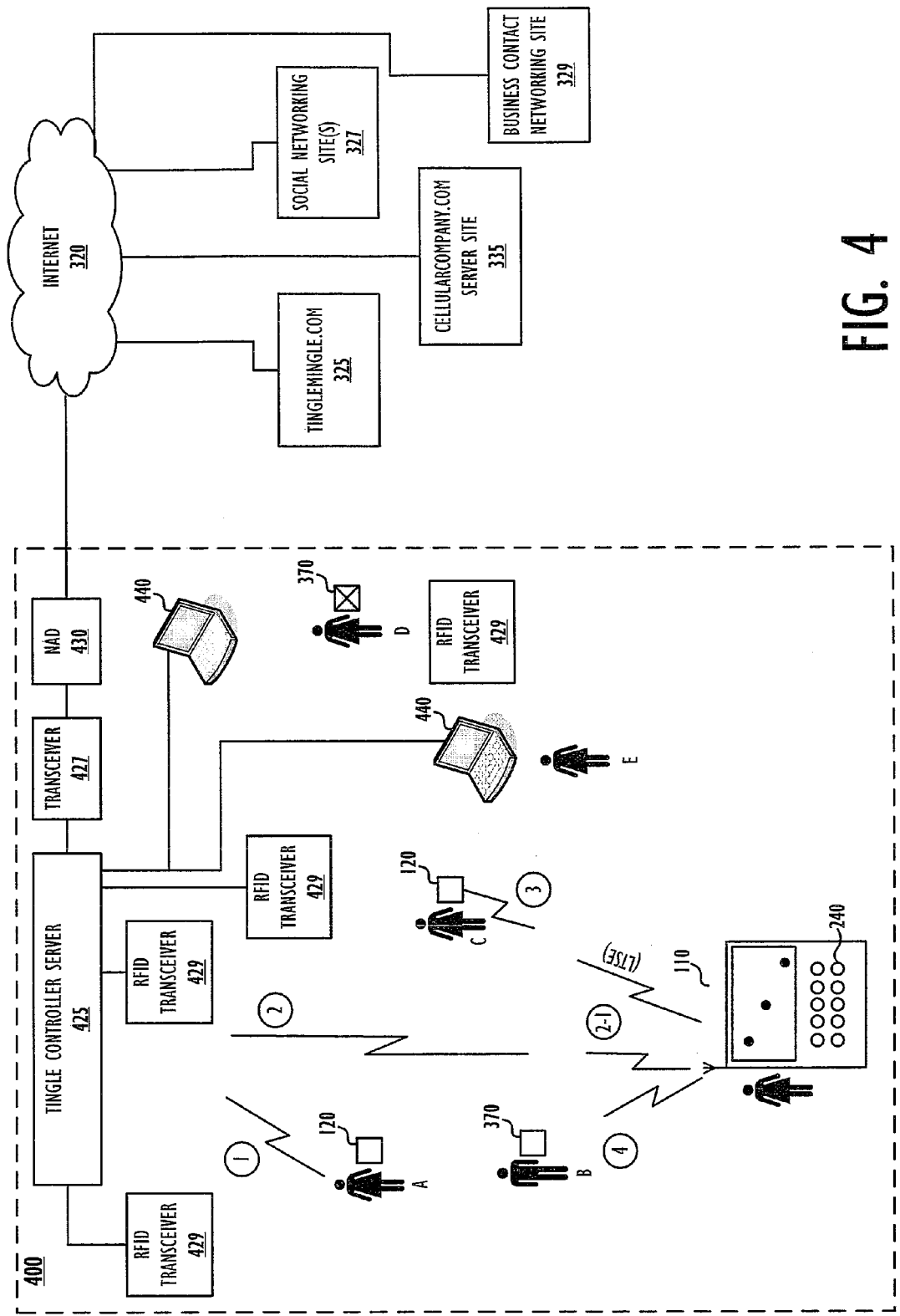
FIG. 4 illustrates a real social environment within which a user of a first PND tracks and communicates with one or more persons having a second PND or a passive PND via one or more of direct information/signal exchange and indirect controller-based information exchange, according to various embodiments.
Figure 11:
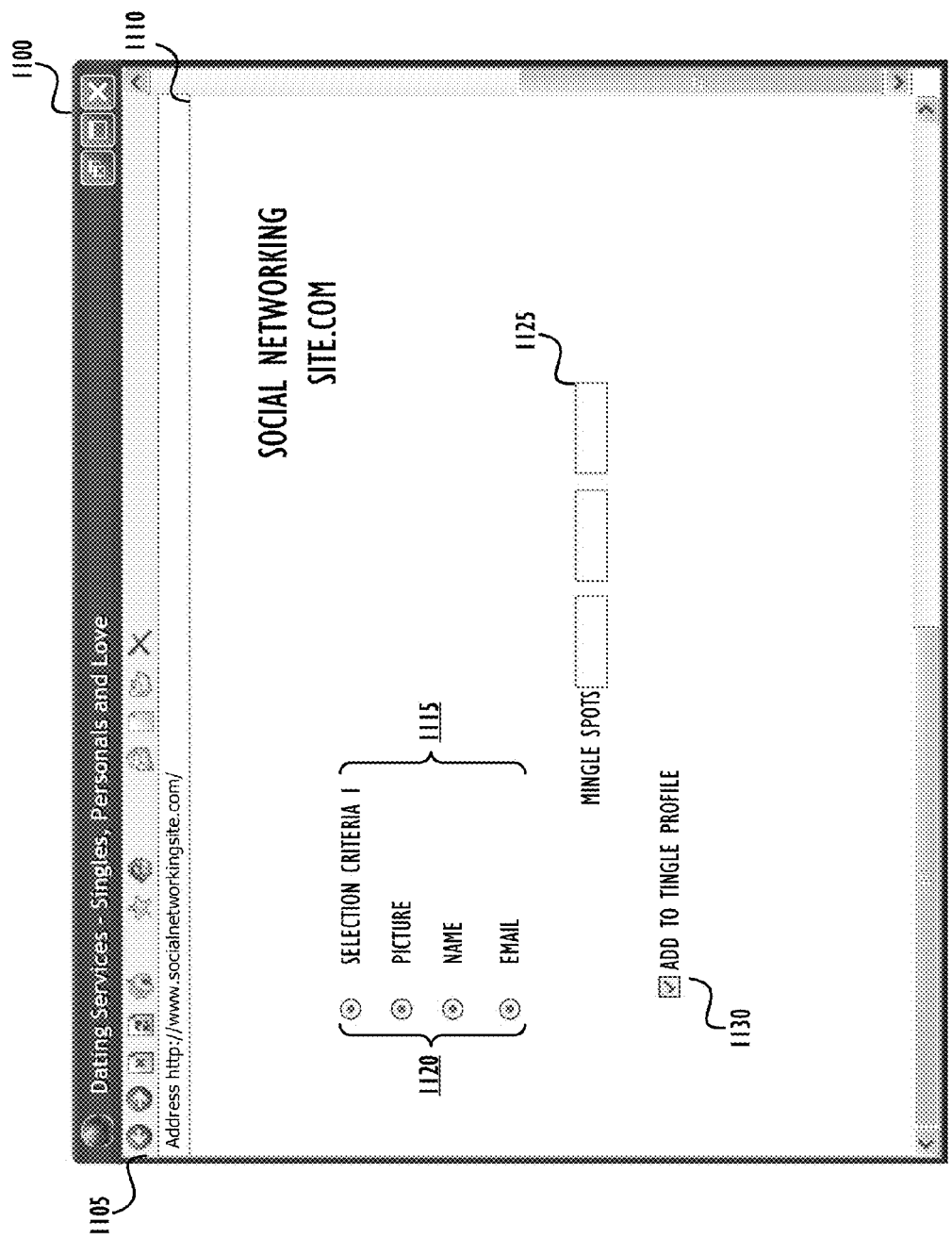
FIG. 11 is a block diagram representation of a web page of a social networking site within which tingle profile data is updated/added, in accordance with one embodiment.

The PND is configured to independently retrieve/receive location and other information about a second PND associated with the second person within the local social environment as provided by FIGS. 1, 2 and 4, and the PND may connect to and retrieve information from remote servers or online websites, as illustrated by FIGS. 3 and 4 and 11. The specific functional features of the PND and operations within PND are provided by one or more utilities that are executed by the example PNDs and supporting computing devices, local and online servers, and these functional features are described and illustrated by FIGS. 5-11.

In the following detailed description of exemplary embodiments of the invention, specific exemplary embodiments in which the invention may be practiced are described in sufficient detail to enable those skilled in the art to practice the invention. It should be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1*xx* for FIGS. 1 and 2*xx* for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. For example, as utilized herein:

(1) PND refers to any device that can be utilized to transmit of receive a tingle from another device and/or any device that is utilized for the purposes of social networking that allows the person to perform one or more functions, including (a) select from a display of list of other persons within a social environment or (b) selectively filter from among multiple persons within a real/physical social environment based on pre-established filtering criteria or preferences; or (c) send and/or receive LTSE messages and/or tingle messages and/or response to tingle messages and/or other forms of electronic communication. As described herein, a PND may be a cellular phone, PDA, smart phone, laptop, texting device, pager, or any other electronic device that provides one or more of the above described functions. (or one active PND and one passive PND).

(2) social or business networking environment refers generally to any location, whether confined by exterior walls or boundaries within which two persons have PNDs that are within communication range of each other to complete an exchange of at least one person's SIS;

(3) tingle refers to the initial signal sent/transmitted from a PND to another PND and may be synonymous in certain implementations with a request for information exchange (RIE). In some applications, a tingle may involve a visual signaling (gesture) between the two parties rather than an electronic exchange. A positive response to a tingle is referred to as a mingle.

(4) mingle refers to the signal sent to indicate that the recipient of a tingle wants to interact or communicate or socialize with the user of the PND that transmitted the tingle within a real social environment.

(5) tingle profile and tingleID refers to the collection of personal information, including a picture or other multimedia data, that is made available by a customer for sharing during tingle exchange and/or that is utilized to screen in/out other persons within the networking environment. The tingleID is the unique label/tag assigned to the tingle profile of each customer. For universal application, each tingleID is different. A tingleID may also be referred to as a unique signature, and may be stored locally on the PND or within the user profile on a social networking site.

(6) tingle portal or tingle terminal is a computer device that enables creation of or provides access to tingle profiles from within areal social environment via a programmed function that dynamically retrieves/downloads the specific tingle profile from a social networking site.

(7) tickle refers to a signal transmitted from the PND requesting the recipient engage in non-personal/non-verbal communication, such as text messaging between the parties.

(8) Tingler™ or Tingle Mingle™ is the name given to a PND specifically designed and/or configured primarily to be a social networking device. This device contrasts with a cellular phone, PDA or smart phone, and similar devices, which are configured with PND-functionality and/or tingle mingle functionality, but which have a primary functional use other than as a PND.

(9) Signature generally refers to a visible representation that indicates the presence of a person (or specifically the PND of the person) at a specific location relative to the receiving PND. In one implementation, each SIS generated by a specific PND contains a unique signature.

(10) LTSE is an acronym for localize text signal exchange, which is a limited range protocol that enables exchange of text signals/messages, instant messages, videos, etc., between two PNDs without requiring a cellular connection (i.e., no cell phone transmission) between the two devices.

(11) Tingle vocabulary refers to a specific set of acronyms, shorten phrases, and similar text or symbols that are provided specific meaning when used in the Tingle Mingle® context of social and business networking, as described herein.

Referring now to the figures, and looking first at FIG. 1. FIG. 1 illustrates a real social networking environment 100 involving use of personal networking devices (PNDs) 110, 120 by two persons at respective locations A and B, according to one embodiment of the invention. As shown, the person (or first PND user) at location A utilizes first PND 110 to transmit a tingle (or tickle) or RIE via wireless transmission 115 to second PND 120 of the person/user at location B, which location is within transmission range of first PND 110. Second PND 120 signals the receipt of tingle by vibrating (or via some other signaling mechanism that is discernible to the second PND user, e.g., ringing or illuminating). Assuming the second PND user (at location B) responds positively (perhaps with a "mingle" response, which may be a simple "yes" or a smiley face icon, for example transmitted back to and received by the first PND), both persons may then meet at one of the two locations (A or B) or at another location (location C) to mingle (i.e., interact with each other) (130).

FIG. 2A illustrates an example PND, with wireless functionality, including RFID (radio frequency identification) and other wireless (for cellular, 802.11 and/or localize text signal exchange—LTSE) transceiver devices embedded therein, according to one embodiment of the invention. As shown, PND 110 comprises a central processing unit 205 coupled to a memory 220 via a system interconnect. Within memory is tingle utility 225, which performs several of the functions of PND that relate to social networking and exchange of information within a real social networking environment. Tingle utility 235 comprises several functional features, including a tingle setup and detection functionality and a mingle set up and detection functionality.

Also illustrated is a tingler card slot or port 232, which provides a point of connectivity for tingler memory card 230. Tingler memory card 230 (or tingler chip) is an small integrated circuit on which is stored personal and other information, such as preferences, and filter criteria associated with the owner of the card 230 (or PND 110). In one embodiment, PND 110 is a normal cellular or other phone that become "tingle operational" when a tingle card 230 is coupled to the serial slot/port 232 of the device, such as the power and communication port. Tingler card 230 would thus be designed with a connection port for communicatively inserting into the devices serial slot/port. In another embodiment, the functionality of tingle card is provided via download to the PND from an online server, a wireless service provider or via an application (app) download/activation (by connecting to software on a computer device or accessible via a network-connected computer device, for example).

PND 110 also comprises wireless transceiver 250 with antenna 252 and RFID/Bluetooth transceiver 255, which enable PND 110 to wirelessly transmit information for social networking. Other short range transmission mechanisms may also be provided and are assumed to be an extension of the depicted embodiment. In a more general application, where PND 110 supports other primary or secondary functionality, such as being utilized as a cell phone or PDA, PND 110 may also comprise wireless functionality for enabling voice and data transfer and/or communication from PND 110. As further provided by FIG. 3, described below, PND 110 also includes devices and operating protocols for enabling network connectivity and access to a background network such as the Internet and access to network sites.

PND 110 also comprises input/output (I/O) devices, including keypad 240 and navigation scroll pad 242, utilized to select specific ones of multiple signatures provided by mingle detect functionality. PND 110 also comprises display device 215, which in one embodiment, is a touch screen display, enabling user to select signatures and message content directly on the display screen.

As utilized herein, the term PND includes any one or various types of devices, including a computer system, such as a portable computer, a personal digital assistant (PDA), an Internet appliance, a gaming device, a communications device, such as a cellular phone, digital wireless telephone or other wired or wireless device. For simplicity, the system is described generally as PND 110, and the specific application of functions within PND 110 are determined by the software program (code) executing on processor(s) of PND 110. The configuration of PND in FIG. 2A generally applies to mobile communication devices, such as an enhanced cellular/smart phone.

As shown by FIG. 2A, PND 110 comprises a central processing unit (CPU) 205 coupled via system bus (interconnect) 207 to memory 220 and input/output (I/O) controller 235. I/O controller 235 operates as a control point for various input and output devices, of which navigation scroll pad 242, keypad 242 and display 215 are illustrated. These I/O devices enable a user of PND 310 to enter inputs, respond to requests, and view tingle-eligible signatures (including the location of such signatures within the real networking environment), as described below.

In the illustrative embodiment, PND also comprises a network interface controller (NIC) 239 and (optionally) a local positioning system (LPS) transceiver 233. The NIC enables PND 110 to connect to a server network or the Internet via access points 315 (see FIG. 3) and/or internet service provider (ISP) 317 (see FIG. 3). Depending on implementation, the NIC 239 may be a wireless device or wired device. LPS transceiver 233 enables real-time determination of the relative location of PND 110 with respect to the other PNDs 120 in the networking environment. As described below, in one embodiment, this location is provided to the tingle utility, which utilizes this location to map the tingle-eligible signatures on the display of the PND (based on their received coordinates) and also to transmit the PNDs localized coordinates to the other PNDs that may be mapping the user's signature.

In one embodiment, where RFID signal transmission is being utilized between the PND and distributed RFID transceivers of a controller (see FIG. 4), the local positions may be determined via triangulation of the received signals. Other methods of determining the location within a controlled environment may involve mapping known items (furniture, walls, doors, windows, bars, bathrooms), and placing sensors/transmitters with specific/unique IDs next to those known items. The PNDs then detect the signals from the transmitters and incorporates those signals with the tingleID in order to provide a rough/relative location of the PND within the larger environment. Triangulation (of two or more received signals) may also be used in this implementation.

PND 110 may also comprise other storage 260, which may also be coupled to system bus 207. According to the described embodiments, storage 260 includes thereon instructions/code/data that is loaded into memory 220 and utilized for/during execution of programs and/or utilities by PND 310. Notably, in one embodiment, the tingleID of the user of the device and the tingle screening criteria and tingle content is stored in storage 260 rather than in a separate tingle card 230, particularly in implementations where there are no tingle cards within PND 110.

In addition to the above described hardware components of PND 310, several of the functional features of the invention are provided via software components (i.e., functional program code or utility) executing on CPU 205 of PND 110. Thus, as illustrated, located within memory 420 are a number of software components or utilities, including: (a) operating system 222, which provides the Internet Protocol (IP) parameters for network connection and communication; (b) browser 229, which enables PND 310 to access and retrieve content from the social networking sites over the Internet, using hypertext transfer protocol (http), secure http (https), file transfer protocol (FTP), universal data protocol (udp), and/or other industry standard protocols; (c) TINGLE utility 225; talking points generation (TPG) engine/utility 226; and (d) local positioning service (LPS) mapping utility 227. The latter two utilities and associated functional features are described in greater detail below.

As introduced above, OS 222 provides the various operational parameters to enable general operation of PND 310. OS 222, in conjunction with web browser 229 provide the internet protocol (IP) (and HTTP) functionality required for network access and transfer of information over the networks through which the networking sites/servers are accessible.

In implementation, many of the novel processes supported by the above four software components are provided as a seamless operation via a single execution of code. Also, for simplicity in describing the invention, and as a preferred embodiment, the collective body of code that performs the various functions described herein and/or the described features of the illustrative embodiments are collectively referred to hereinafter as tingle utility 225. References to tingle utility (or execution thereof) thus cover the entire range of social networking functions provided by the illustrative embodiments, including those of TPG engine 226, which occur at/on PND 110.

Those of ordinary skill in the art will appreciate that the hardware depicted in FIG. 2A may vary depending on implementation. Thus, the depicted example is meant solely for illustration and is not meant to imply architectural limitations with respect to the present invention. For example, it is understood that the functions of the invention are applicable to other types of communication devices and that the illustration of PND 110 and description thereof as a specialized device is provided solely for illustration. For example, PND 110 may be a mobile phone, personal digital assistant (PDA), a Blackberry™, an Ipod®, iPhone®, or other similar portable device with the functionality to support PND and tingle based features. Similarly, while described as a portable or mobile device, PND 110 may also be a non-portable (e.g., desktop) terminal within the networking environment with similar functionality as that of PND 110.

When implemented with a cellular phone or similar communication device, PND 110 comprises digital signal processor (DSP), which handles the receipt and transmission of analog and/or digital signals. In some implementation DPS may be a part of CPU 205, with both functionality integrated into a single component. It is further appreciated that the functions of both components operate in concert, where necessary, to provide the speech communication and tingle mingle features of PND 110.

PND 110 may be a GSM phone and include a Subscriber Identity Module (SIM) card adapter, which couples a SIM card to the controller. The SIM card may be utilized as a storage device for storing specific user profile data of the particular user to whom the SIM card is associated. In this context, tingler card 230 may be a SIM card programmed with the specific features required for operation of the social interaction functions described herein. In a preferred embodiment, PND 110 is a dual or tri-mode device, capable of communicating via wireless cellular communication and wireless IP (Internet Protocol) communication and wireless localize text signal exchange (LTSE) protocol. When PND 110 is used, connection to network may be completed via wireless communication using cellular, digital, or infrared communication technologies, among others.

Referring back to the description of the tingle utility 225, following activation of PND 110, TINGLE utility 225 executes on CPU 205 and provides a series of functional processes, which are illustrated and described below within the descriptions of the embodiments. Generally, TINGLE utility 225 provides the method functions of illustrated by the flow charts and described below. Other functional features of the invention, including expansions of the above described and/or illustrative embodiments are now provided is list form. The order of presentation is not intended to suggest any ordering in implementation or importance attributable to any one item. Generally, the invention entails use of a PND, which may be a specialized device (Tingler™), or a cell phone or other portable communication device that is configured with the hardware and firmware/software utility to enable the PND complete some or all of the following functions (cia executable code executing on the PND's CPU/processor) when the activated within a real social environment having at least one other person with a PND or passive PND: (1) transmit a tingle (hello signal) across an networking environment to another PND; (2) send a picture along with the hello signal; (3) transmit a text message to the second PND and receive text messages and/or multimedia files from the second device; (4) receive a request to mingle (engage in a conversation or meet someone) and respond by accepting the mingle; (5) generate an automatic query that is transmitted when a tingle is initially transmitted or received (e.g. are you married; do you smoke); (6) set the PND mingle-enable or mingle block mode; (8) display the location of the PND signature (tingleID) on a graphical screen as a dot (where each signature may display different visual characteristics from other signatures, such as color, size, mark-through, where each characteristic is linked to a set of pre-programmed or preset characteristics, such as nationality/race, height, sex, married, single, dancer, group affiliation, and others); (9) create unique hello and/or response messages.

The PND further comprises the hardware and firmware/software utility to enable the PND complete one or more of the additional functional features of: (10) set up short but keys for texting and communicating; (11) transmit via Bluetooth, RFID or other wireless transmission protocols; (12) transmit to email engine on computer (laptop) and generate automatic e-mail; (13) allow immediate transfer of phone number via smart button; (14) allow easy request for email and/or phone number; (15) link to social networking sites (including Myspace™ and Facebook™) and provide/download specific types of general information (e.g., name, age, looking for, picture) from the networking sites (All other information stored in coded file that is downloaded to device and used to select among candidates within the area); (16) link to a database and or specialized tingle mingle networking site and retrieve tingle specific information for use in the networking environment; (17) color code or text personal options to describe persons, e.g. blade female (Bf); Cuban Latina female (Cf); blonde (Blf) (18) allow group conversations via instant texting feature or transmit multiple tingles simultaneously; (19) enable voice talk via "walkie talkie" SMS (or push to talk) close range voice communication between matching of tingle ID pairs; (20) allow anonymous texting without picture; (21) enable an easy let down button via a block feature, which blocks specific tingleIDs; (22) share info with direct transfer to another PND device; (23) store received info of person who responds positively to tingle; (24) show mapping of other devices in networking environment with PND feature activated; (25) select/lock on to signatures of interest and transmit "tingle" to one or multiple simultaneously via multiple tingle functionality; (26) allow screening of the tingleIDs/signatures that are displayed, based on pre-entered selection criteria (e.g., women, (age 18-24, single); (27) allow temporary tracking (e.g., 90 seconds) after selecting and locking on to a signature to track movement while the person makes his/her way over, even if the person moves; (28) a "tracked" person can set his/her PND to block tracking (provide a view of anyone who has "locked" in or a message "you've been locked" and allow the person to "b" lock (unlock and block) so that the tracked person ("b" locked) disappears from the originating PND screen; (29) temporarily or permanently block a signature from showing up on the PND or block a person from seeing your signature on their PND; and (30) generate a "mingle later" response which provides a temporary block (provides a different color or other characteristic change of the signature on the requesting PND display)—allows person to come back on screen later with an "I'M ONLINE" or "lets mingle' response.

In addition to the above functionality of the tingle utility 225, PND 110 also comprises a talking points generation engine/utility 226, with the various associated functionality of that engine/utility provided as an addition to, extension of (or embedded within) tingle utility 225 in some embodiments. In one embodiment, the talking points generation (TPG) engine 226 is located at an online server that is accessible to the PND 110 and on which may be stored the user profiles utilized as described herein. In one embodiment, the utility (via TPG engine) generates specific talking points based on one or more of a plurality of criteria, including but not limited to: (a) the specific location/environment (e.g., business versus social), including information about the specific environment/event; (b) known qualities of the user to promote active engagement (e.g., topics of interest to the environment or to the user); (c) profile information received from the person initiating the communication; (d) the user's pre-selected talking points (e.g., confidence boosters, reminders of what to do or not do, say or not say, etc.); (e) the profile of the user, for that location; and (f) the specific pre-identified goal of the user in being at the particular event/establishment/physical location. In one embodiment, this generation of talking points involves some real time evaluation that may occur on the local PND or at the online support site that is immediately accessible and programmed with a talking points generation engine.

FIG. 2B illustrates an example passive PND (or tingle chip) 270, by which a pre-programmed user signature is stored and a transmission of that signal and select information is passively made within the social environment, in accordance with one embodiment of the invention. That passive signal may then be detected and/or received by an "active" PND with receive and transmit functionality, such as the PND of FIG. 2A. In one specific implementation, participants to a business conference (perhaps where there are groups of people with different interests) are each given a name tag that includes a passive PND (i.e., some sort of personalized identification). The passive PND 270 may be pre-programmed with the person's name, company, area of interest and business contact information. Other participants with a PND "tuned" to (i.e., set to receive the data from) the passive PND would then be able to locate persons of particular interest to their business area from among the larger groups of conference participants or attendees. Conference specific information may also be programmed into the passive PNDs, such as which sessions the participant is to attend (helps conference planners to direct participants to their area/session/room). Car pooling information may also be programmed enabling persons to locate others seeking to car pool to the airport, and the like. The amount/types of information that may be pre-programmed may only be limited by the memory capacity of the passive device. Where the passive device only provides a signature that is then matched within a background database for retrieval of more information about the participant, the amount/type of information is not memory-bounded.

FIG. 3 provides an example network, illustrating different paths of connectivity between a PND 110 and various social network sites and business network sites having a plurality of users/customers connecting via the Internet, in accordance with described embodiments of the invention. As shown, PND 110 connects via wireless cellular transmission to a base station 330, which is connected to a cellular provider sever 335. PND 110 may also connect to a network provider server (ISP 317), via an access point 315 in vicinity of the PND 110. Access point 315 may be a wireless access point, which implement the 802.11 Wireless Ethernet protocol ("WiFi"), or a hardwired Ethernet connection port. PND 110 transmits wireless communication to base station 330 (having an antenna and mobile station controller (MSC)), and base station 330 relays that wireless communication through a wireless network (infrastructure) to service provider server 335.

From both servers (317 and 335), PND 110 is provided access to the Internet 320 and specifically to the various social and/or business networking sites. Example sites include commercial (.com) sites Tingle Mingle™ 325, other social networking sites 327 (such as Match.com®, Facebook™, Myspace™) and business contact sites 329 (e.g, LinkedIn®). These commercial sites provide multiple users/customers with access via computing devices 340/345 to enter the users' personal and networking information/data to be utilized during online networking. Some of this information, e.g., picture and name and screening criteria, may be tagged for download to a PND 110 on request by the user of the PND 110 once the correct access credential (e.g., login name, password combination) is provided on the PND 110. FIG. 11 illustrates an example browser page 1100 of a networking site that supports download of customer selected information for use by a PND or within a physical networking environment in which tingle functionality is supported. As shown, web page 1100 has standard navigation/menu buttons 1105 and an address bar 1110 within which the universal resource locator (URL) or webpage address of the networking site is provided. As also shown, web page 1100, includes an information entry area 1115 in which specific information related to the customer, including biographical information (name, sex, age, email address) and selection criteria (type of person looking for, interests, dislikes).

One or more of these entries may be tagged via tingle select tags 1120 to enable download to a PND on other device within a physical networking environment. Additionally, webpage 1105 also comprises a tingle profile entry 1125 at which the customer may enter specific networking environments that the customer frequents or at which the customer wants to make the particular tingle profile data available. Finally, a select button 1130 enables the customer to update the tingle profile of the customer, which profile is maintained within the customer account at the networking server. A customer with a PND may then depress the button (or select a menu option) to download the tingle profile, which is downloaded from the social networking site and used within the physical networking environment to enhance the tingle/mingle experience.

Additionally, in one embodiment, the Tingle Mingle™ or other networking site provides specific access to additional information that may be retrieved to enhance the mingle experience. This information may be made available only to customers using a Tingler™ as their PND. For example, VIP access may be subscribed to and provide additional information about the person(s) whose signature is selected/highlighted on the PND. As another example, the person may automatically receive a picture associated with a signature only when both are subscribed members of the Tingle Mingle™ site.

FIG. 4 illustrates a social environment within which a user of PND 110 identifies, tracks and communicates with other persons having a PND or passive PND via one or more of direct information/signal exchange and indirect controller information exchange, according to various embodiments of the invention. Five different potential network-eligible persons are illustrated, labeled with reference letters A-E, with some having PNDs, others having passive PNDs, and still others not having any type of PND or PND-enabled device. PND may communicate directly with other PNDs via wireless connection 4 (RFID or other wireless protocol), support LTSE on LTSE communication link 3, or may communicate indirectly via a tingle controller 425 on wireless communication link 2.

Tingle controller 425 may be a central control device that provides or is coupled to RFID transceivers 429 or other-type transceivers 427 dispersed around the real networking environment 400 (e.g., in the roof of walls of the establishment or surrounding areas). These transceivers 427/429 enable the PNDs to exchange information (or communicate) through the server such that direct line of sight to the person of interest is not a requirement for implementation of the functional features in densely populated environments. Tingle controller 425 also supports/enables remote access to social networking sites via a network access device (NAD) 430, which connects to the Internet 320 via an Internet service provider (ISP).

According to one embodiment, one or more tingle terminals 440 may also be dispersed throughout the networking environment to enable users without a PND to conduct their search for persons of interest (based on entered selection criteria) within the environment. With tingle terminals 440, one alternate embodiment enables a single PND to retrieve information from a database that includes information about persons in a pre-defined environment, such as a club with known initiators/customers, for whom tingleIDs with relevant mingle information are maintained. The tingle profile (with mingle options) also indicates whether the customer is interested in mingling.

The tingle profile of a customer may be updated by the customer remotely (on the social networking site, FIG. 11) or from within the physical networking environment using the tingle terminals 440. For example, when a client/customer arrives at the networking environment, the customer may set his/her "in-club" status to "on" and set or enter other mingle options associated with their tingleID (tingle profile) so that other customers/clients (particularly ones with a PND or ones with access to the tingle terminals 440) will know they are present in the networking environment by a display of their signature on the PND or tingle terminal 440.

In one embodiment, the tingle terminals 440 serve as an "easy" portal to the social networking sites that enable quick access to and retrieval of a tingle profile from the specified networking site. A customer enters their tingleID and tingle password. The tingle terminal automatically performs a background search and match of the tingleID with the appropriate social networking site, then downloads the tingle profile. In another embodiment, the tingle terminals 440 along with the server, themselves provide a localized social networking site (not specifically requiring access to an online site). The tingle terminals may be equipped with a mini camera to collect a picture of the customer and entry options to enable the customer to enter the information to be used as their tingle profile. This information may then be encoded into a PND or a passive PND, which is provided to the customer to allow for locating the customer within the networking environment. The business conference model described herein allows for the entry of the information by the conference planners prior to the conference attendee arriving at the conference and receiving their name tags with detectable tingleID embedded therein (or a passive PND).

Figure 5A:
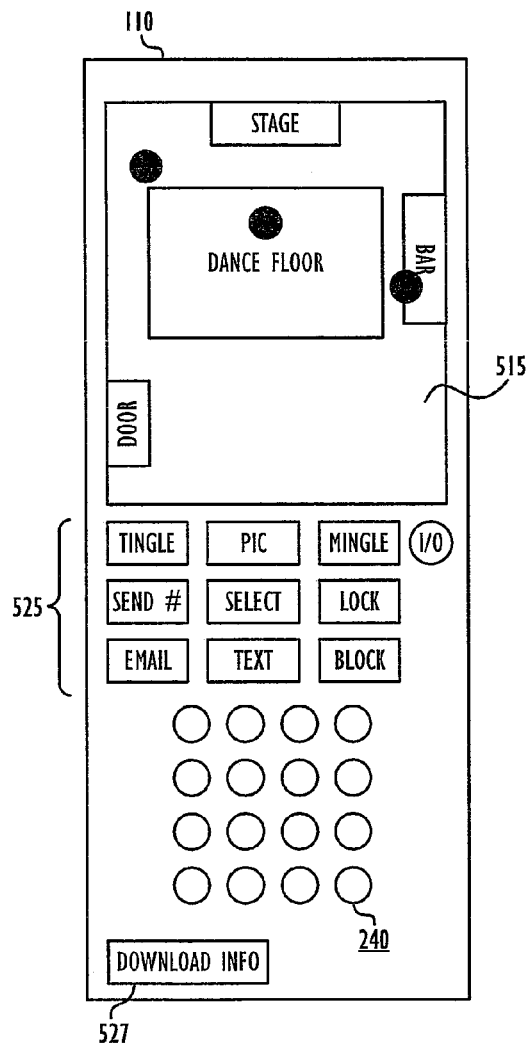
FIG. 5A is a block diagram representation of an example PND with functional input buttons and a display indicating signatures of other PNDs and passive-PNDs within an establishment, according to one embodiment.

FIG. 5A is a block diagram representation of an example PND with functional input buttons and a display indicating signatures of other PNDs and passive-PNDs within an establishment, according to one embodiment of the invention. As shown, in addition to a standard keypad 240, PND 110 has several functional buttons 525 that are pre-set or pre-programmed to provide certain responses/features when depressed. Among these buttons are tingle (send request/hello to mingle), mingle (agree to mingle), send pic (transmit stored picture), send number (transmit telephone number), send email (address), text (initiate LTSE texting), lock (temporarily track signature for preset period), and Block (block person from receiving signature). In one embodiment, when the lock button is selected, the device whose signature is locked receives an indication that their signature has been locked. This enables the device user to decide whether to respond by blocking the person so that they cannot be temporarily tracked by the other person). Additionally, PND 110 comprises download button 527 by which PND may connect to the local server or ISP and download tingle data from a database (such as an online networking site).

Figure 5B:
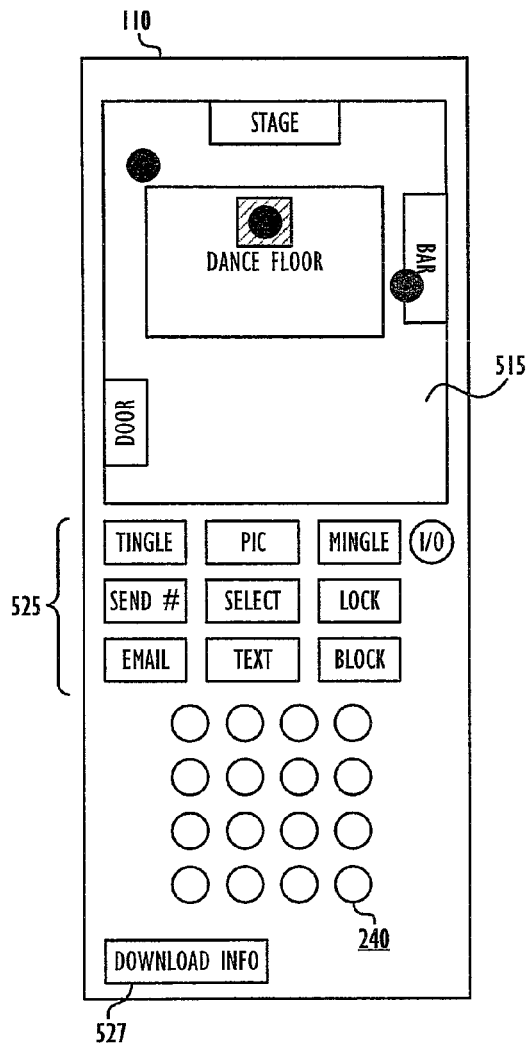
FIG. 5B is a block diagram representation of the example PND of FIG. 5A with one of the displayed signatures selected to send a social interaction initiation signals (SIIS or SIS) to, according to one embodiment.

FIG. 5B is a block diagram representation of the example PND of FIG. 5A with one of the displayed signatures selected to send a tingle/tickle to, according to one embodiment of the invention. The user selects the particular signature using the scroll function buttons on the PND. When the display is touch screen, the user may select the signature by touching the screen above the signature. In one embodiment, once the user selects a particular signature, a list of available options for interaction with that person is presented. The owner of the particular signature may have blocked certain options and specified which options are available for socializing/interaction. This edited list of options is conveyed within the SIS that is captured and made available when the signature of the person is selected by the user of the PND. The permitted options may be, for example, "let's talk at the bar" or "looking for dance partner only", while blocked options may include "what's your number". While illustrated as a physical device with functional buttons, it is appreciated that the above functional features of PND may be provided as a virtual PND via a graphical user interface of a different physical device (such as a PDA or smart phone), which displays the selectable options to the user of the device for tactile (touch screen) selection or functional (button) selection (where buttons on the device correspond to "visual buttons" on the display screen of the real device.

Certain other features are supported by the present embodiments to enable advertising of services within a business networking environment. For example, an employer at a conference or job fair may advertise for matches to specific employee requests. That is a job seeker may transmit a SIS indicating their skills and qualifications and other profile data (education, etc). The employer then selectively sends RIEs to those PNDs of prospective employees whom the employer may believe to be a match to some position they are trying to fill or interviewing for. job seekers. The job seeker may also be selective in which opportunity would be welcomed. Thus, the SIS may include "looking for" criteria to increase the likelihood that the two parties will actually match each others expectations.

Aspects of the above embodiment enable some amounts of self promotion. Additionally, such promotion may be extended to a particular product or service. One practical implementation of this embodiment could be a vendor within a specific location relative to potential purchasers may transmit information about products that are being sold ad the price of such products. The potential purchaser who is looking for such products (by pre-setting the search function on his PND) would then signal receipt of a SIS with information about where such products are currently being sold in the vicinity of the purchaser.

In yet another embodiment, different version of the PND software (tingle utility) or different pre-established user information may be downloaded to the PND based on the determined location of the PND. With the user pre-setting different profiles based on the different establishments the user intends to enter, (e.g., club, bar, work, job fair, church, etc.), the tingle utility determines the location of the PND and downloads or activates the user profile set that is appropriate for that establishment and activates an appropriate mingle feature/response as well. Information specific to what the user of the PND wished to display in a specific environment is then made available for sharing to another PND, while other different information is held back or screened out from the user profile that is made available for sharing. As a practical example, attendance at a business event triggers the tingle utility to activate a "biz mingle" profile, with resume information, such as a business card, company, position, looking for criteria (if an employer at a job fair), and the like. In contrast, when in a nightclub, the tingle utility activates a "clubbing" profile, which provides a much different set of information. Implementation of the above selective activation of specific profiles, based on social/business networking activity or location, assists the users of the PNDS to connect with the right persons, particularly when in a business networking environment. This functionality also eliminates some of the hassle of guessing who is who and who is in attendance at an event or within a specific location/establishment.

FIG. 6 is a block diagram illustrating an example display of a PND that has received a tingle from another PND, in accordance with one embodiment of the invention. As shown, a the receiving PND 120 displays the picture 620, a greeting 625 which includes the name of the initiator and a specific request 630, which in this embodiment is a request to mingle. Notably, different requests may be transmitted, depending on the available functions on the initiator's PND. Foe example, the request may be for (a) a phone number (632), (b) an email address, or (c) a request to engage in a text message exchange (631).

Figure 7:
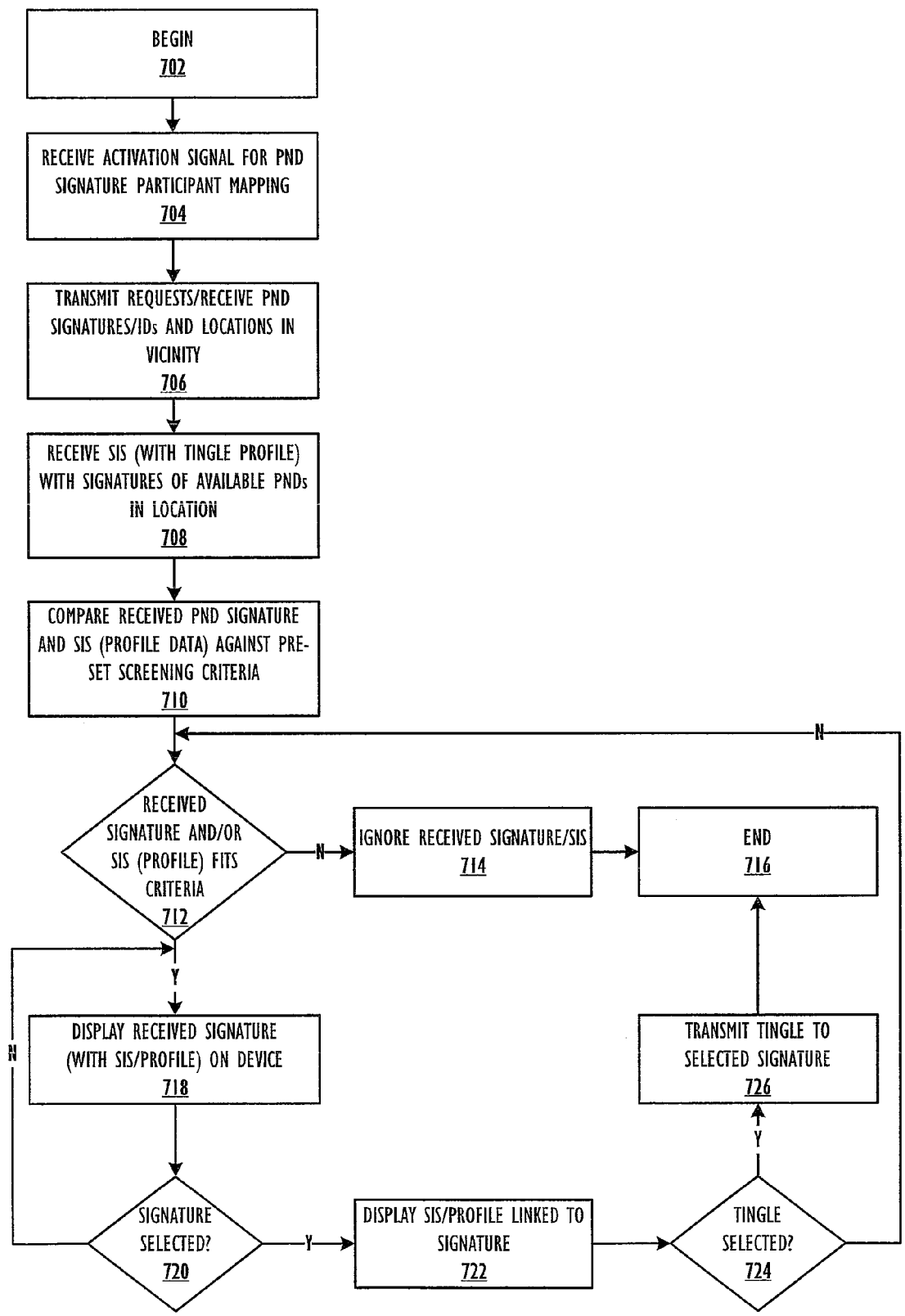
FIG. 7 is a high-level flow diagram of the method by which a PND is activated and utilized to transmit and receive SIIS and/or respond to received SIIS, in accordance with one embodiment.

FIG. 7 is a high-level flow diagram of the method by which the PND 110 is activated and utilized to transmit and receive tingles and/or responses to received tingles, in accordance with one embodiment of the invention. The process begins at block 702 and proceeds to block 704 at which the tingle utility receives an activation signal for participant mapping. The utility transmits an RIE to request receipt of PND IDs (SIS) (block 706). The utility receives signals (signatures) of available PND IDs along with their location information (block 708). The utility compares the received signatures and the associated profiles or other information against certain pre-set screening criteria (block 710), and then determines is any of the received SIS fits the criteria (block 712). When a received SIS does not fit the pre-established criteria, the tutiltiy ignores the received SIS (block 714), and the process ends (block 716). However, when the received SIS fits the pre-set criteria, the utility displays the signature at the corresponding location relative to the PND (block 708). The utility then monitors at decision block 720 whether the particular signature (tingle ID) is selected. When a displayed signature/ID is selected, the utility retrieves the corresponding profile and displays the profile information and selectable options on the PND (block 722). If the user of PND then selects the option to transmit a tingle (block 714), the utility initiates a transmission of the appropriate tingle (or RIE) to the device generating the particular signature (assuming an active PND device) (block 726).

Figure 8:
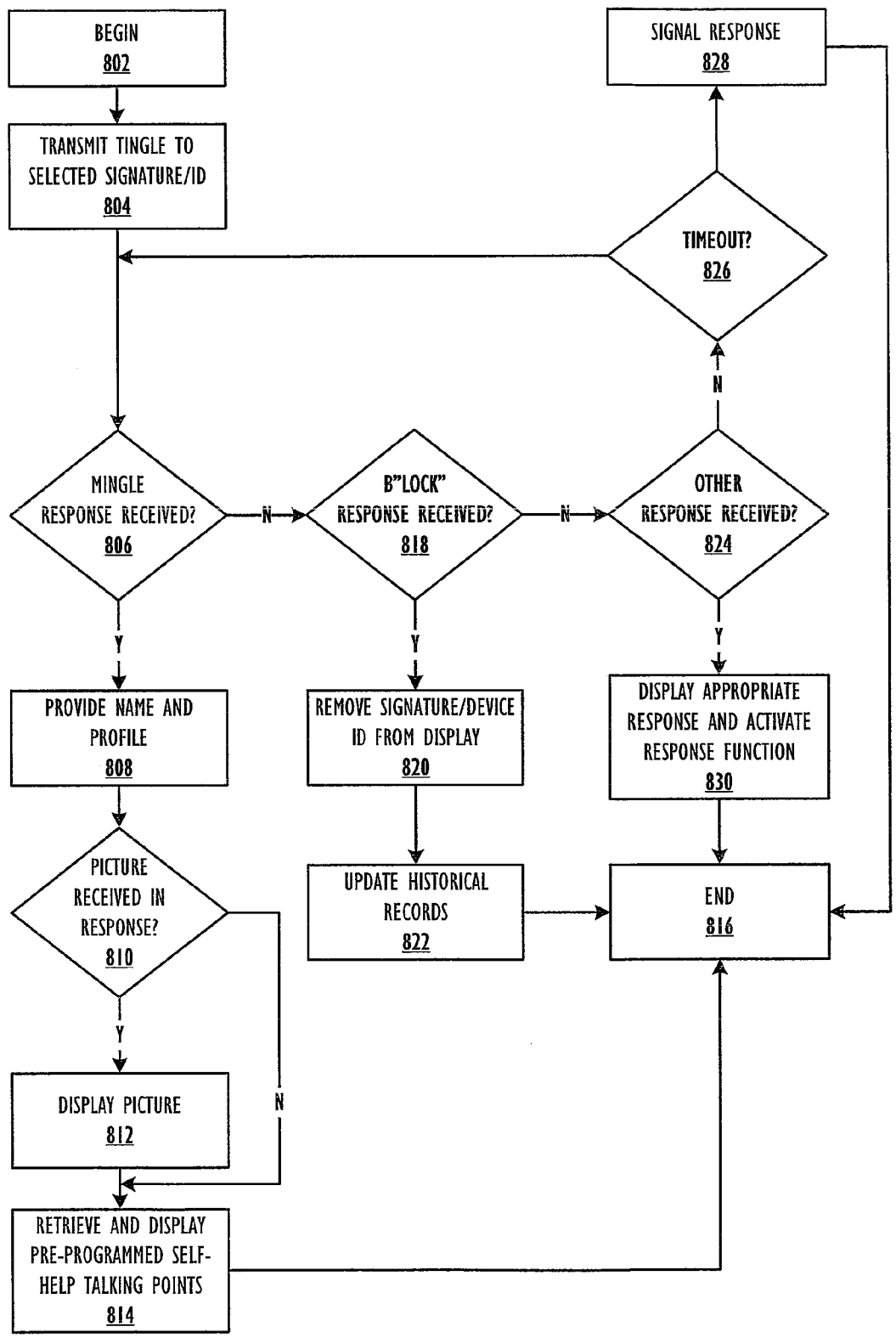
FIG. 8 is a high-level flow diagram of the method by which responses to SIIS are handled by the PND, in accordance with one embodiment.

FIG. 8 is a high-level flow diagram of the method by which responses to tingles are handled by the PND, in accordance with one embodiment of the invention. The process begins at block 802, following which the utility transmits a tingle to the selected PND (associated with the tingle ID/signature selected) (block 804). The utility then determines at block 806 if a response is received to the tingle request. When a response is received, the utility transmits name and other information (pre-set for transmission by the PND user at that social environment) (block 808). The utility determines at block 810 whether a picture was received with the response message, and if a picture was received, the utility displays the picture on the display of the PND (block 812). The utility also retrieves and displays any pre-programmed self-help talking points (block 814). This process is important for those individuals who may not be adept at communicating. The functionality may also be helpful in the business networking environment, where the information retrieved has some relevance to the business conversation that the person is about to engage in.

Returning to decision block 806, when no mingle response is received, the utility determines at block 818 whether a Blocked response is received, which indicates that the person with the signature has blocked the user form communicating with him/her (or is not interested in communicating/socializing/interacting with the PND user). When a "Blocked" response is received, the utility automatically removes the signature from the list of available signatures displayed to the user of the PND (block 820), and the utility updates its historical records to store the signature that was blocked (block 822). This enables the utility to manage future attempts by the PND user to communicate with that signature. In one embodiment, such attempts result in the utility generating and presenting a caution with the stored "blocked" history to the user. If no blocked response is received, but another response is received (block 824), the utility then displays the appropriate response and activates the appropriate response function for the received response (block 830). A timeout condition occurs (block 826) when a pre-set time elapses without receiving any response at all to the RIE or tingle.

FIGS. 10A-10B illustrates example responses provided on the display of a originating PND (110) of the person who generated the tingle, according to embodiments of the invention. Similarly to the information provided by the tingle, as shown in FIG. 6, the information provided in the response may include a picture 620B, a name 625B, as well as a response 630B to the request. Other possible responses include a response/request to text 631B and a phone number 632B.

Additionally, as shown by FIG. 10B, none positive responses may also be provided (and one or more of these may be automatically programmed into the destination PND). The illustrated example responses include: No, later (which may include certain specific considerations of time and/or place), married, and boyfriend (BF), for example. These examples are not intended to be exhaustive of the possible responses or types of responses that are available or of the mechanism by which the responses are generated and/or transmitted. Persons may turn their PND functionality off, and or set to only receive tingles (or information) from a pre-defined set of tingleIDs or from tingleIDs of persons that meet very specific pre-programmed criteria.

Figure 9:
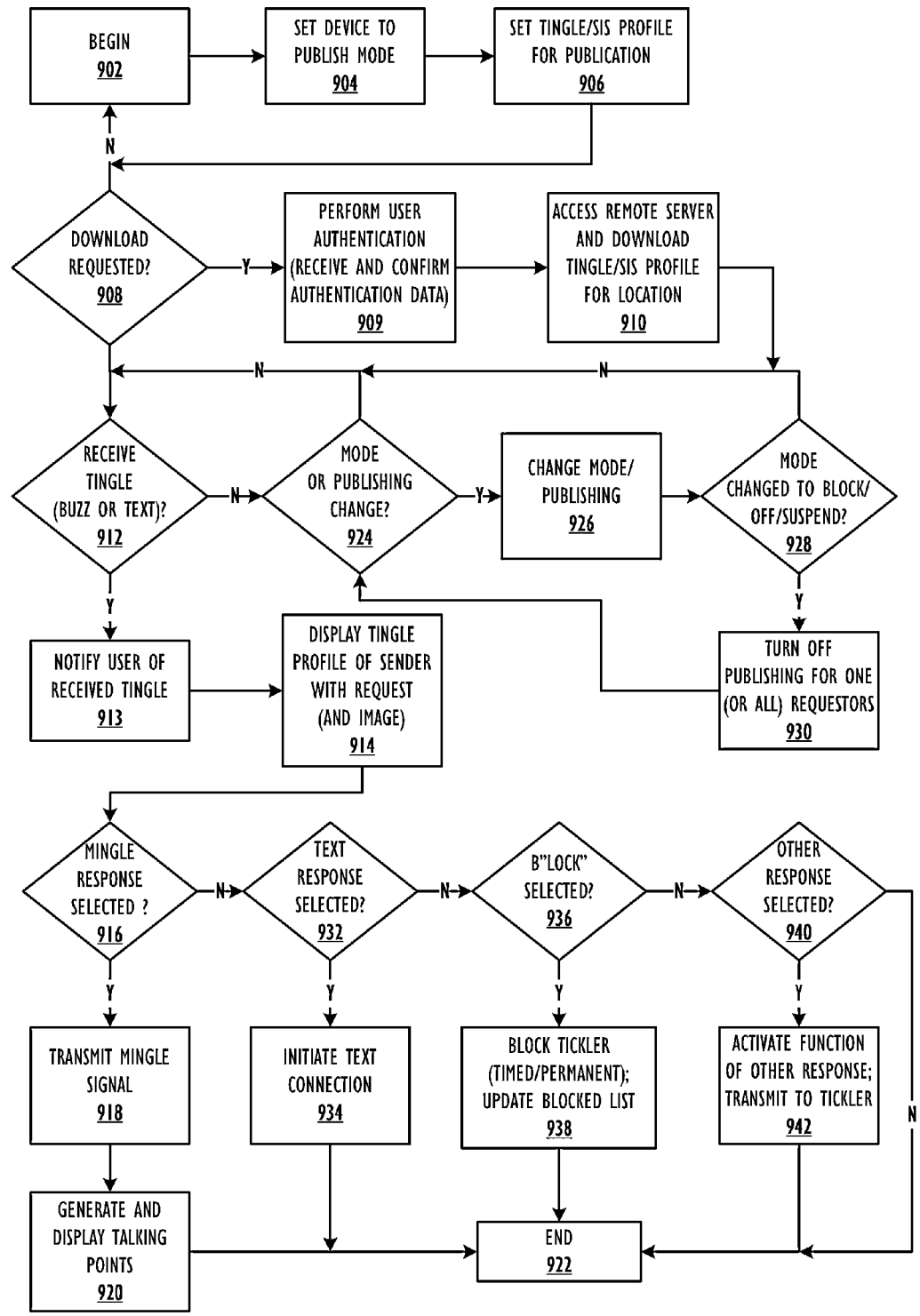
FIG. 9 is a high-level flow diagram of the method by which the PND is pre-programmed with select user information and by which responses to received SIIS are provided, in accordance with one or more embodiments.

FIG. 9 is a high-level flow diagram of the method by which the PND is pre-programmed with select user information and by which responses to received tingles are provided, in accordance with embodiments of the invention. The functional steps illustrated are performed by the tingle utility and/or social network website utility (enhanced to enable certain of the functionality described herein in the context of the tingle utility) and further extends the operations described with the flow charts of FIGS. 7 and 8 beyond the single PND to a network environment. Specifically, however, the method of FIG. 9 describes some of the interactions that occur with the social networking site at which the particular tingle profile of biographical data is selected for display in specific locations/environments. The method begins at block 902 and proceeds to block 904 at which the utility receives an entry to set the PND to publish mode (i.e., to activate the publishing feature of the tingle mingle social media application). The utility then received entries to set the tingle profile (or personal information) that is to be published (block 906). In at least one embodiment, this process may involve selecting a specific set of profile information to associate with a defined set of distinguishable publication environments (e.g., business profile, club profile, family event profile, sporting environment profile, etal). With the profile(s) set for publication, when a request is later received to download a profile (block 908), the tingle utility first requests and receives the correct authentication data from the user (block 909).

In one embodiment, downloading or activating of a user profile is preceded by receipt of a pre-established user authorization data, such as a password or biometric data (e.g., a finger scan) on the PND. The user profiles are only made available on the PND when authentication is completed by the utility of the user requesting the profile's download and/or activation. The specific authorization may be established by the user specifically for use in the real world environment in order to prevent theft of an online user profile to also result in real-world passing off by the thief of a fake persona using the stolen online user profile. Separate precautions are established and followed by the utility (e.g., prompts for other personal information and privately stored authentication answers that cannot be retrieved by simply accessing the user's online account) in enabling real-time user authorization for download and/or activation of a user profile on a PND.

Following the authentication at block 909, the utility then causes the PND to access a remote server and download the tingle profile specific for the location in which the PND is presently in (block 910). For example, when the user of the PND enters a specific environment (a business networking event) and selects a download option provided by the tingle utility, the user may also select the "business profile" as the specific profile to download (when multiple different profiles exists within the user's tingle account or other online social networking account. On receipt of the entries from the user, the PND accesses the corresponding server hosting the profiles and downloads the profile to the PND. In a first alternate embodiment, the user profiles are stored locally on the PND and the user selection of a profile triggers activation by the utility of that selected profile.

At block 912, the utility determines if a tingle is received at the PND. At block 924, the utility determines whether an entry is received to initiate a change to a communication mode or publishing criteria. When a change request is received, the utility receives the change entry and modifies the communication mode and/or publishing criteria (including profile data to be published, if profile change is also requested) (block 926). When the mode change indicates one of several types of communication modes (e.g., block, turn off, or suspend communication (block 928), the utility turns off the publishing capability for one or all requestors (block 930). For example, the block mode may be set for a specific other user, with whom the PND's user does not wish to share information, while other users are not blocked from communicating with the PND.

Returning to decision block 912, when a tingle is received on the PND, the utility notifies the user via one or more mechanisms, such as audible (e.g., alarm, sound, beep), visual (text or illumination), and tactile (e.g., buzzing, vibrating, etc.) mechanisms of the receipt of the tingle (block 913) and displays the profile or transmitted message associated with the sender of the tingle request (or RIE) (block 914). In one embodiment, a profile image of the RIE sender is also displayed.

Following receipt of the tingle (RIE), at decision blocks 916, 932, 936 and 940, the utility detects whether certain responses are selected by the user of the PND via entry on the PND. At decision block 916, the utility determines whether a mingle response is selected (via receipt of an input that selects/is associated with that response). When a mingle response is received, the utility transmits the mingle response (block 918), which may include additional information such as a place to mingle/meet within the establishment/physical location. As with a user initiated meeting, the utility also generates and displays to the user one or more talking points (block 920). In one embodiment, the utility generates specific talking points based on one or more of a plurality of criteria, as described above (see FIG. 2 description of TPG utility).

At decision block 932, the utility determines if a text response is selected by the user, indicating that the user will engage is a SMS message exchange via texting feature of the respective devices (assumed to be texting capable). When a selection is detected/received of a desire to engage in a text response, the utility initiates a text connection with the other user's device (using the wireless provider text functions of the PND) (block 934). If at decision block 936 the utility detects selection of a "block" command, the utility then changes the mode of the PND to block communication or receipt of further communication from the sender's device (block 938). The block of communication may be a one time block (user is now unavailable but may become available later) or permanent (the user has no interest in ever communicating with the blocked party). A listing of blocked signatures and corresponding profile information is stored in the PND or uploaded to the user's online account so that the user may access that information at a later time and modify the blocked status of the specific parties subject to such blocked treatment. For example, modifications may include a change in the length of time or the specific locations in which the block on that specific user/person is active. Thus a block on someone from communicating with the PND user at a business networking event may not be extended to a social event, and vice-versa. It is appreciated, that the selection of a blocked response may be communicated to the sender's PND by that device's utility simply cancelling the display of the PND's signature on the display of the sender's PND. With the signature erased from the display, the sender than cannot initiate a tingle, as that blocking feature is specifically designed to allow persons to prevent others from sending them unwanted requests.

If, as determined at block 940, another response is detected by the utility, the utility then activates the appropriate function associated with that other response (block 942), and the utility transmits any notification, if any, that is required by execution of that function. A large range of other responses are supported by the utility, some of which are presented herein. However, the vast amount of such responses, which may be individually created and stored by the PND's user, either before hand or in real-time, and are too many to list and/or describe within the present specification. The processes of the method of FIG. 9 ends with terminating block 922.

In above described embodiments and aspects thereof provide a method, electronic device and computer program product for completing a plurality of functions that facilitate social interaction within a real "social and business networking environment" (SoNET). Specifically, the electronic device, which is referred to herein as a personal networking device (PND) comprises: a processor; a memory coupled to the processor; one or more input/output (I/O) devices that enables interaction with processes executing on the PND; and a utility executing on the processor that controls the operations of the PND to perform the functions of: receiving via an electronic medium a signature associated with a second device within a real social/business networking environment (real SoNET); enabling selection of the signature by outputting the signature for possible selection; receiving the selection via one of: dynamically selecting the signature based on a match of the signature to one or more pre-established criteria; and receiving user toggling and selecting, via an input device, of the signature from among one or more signatures displayed on a display device of the PND; responsive to receipt of a selection of the signature, enabling transmission of a request for interaction and/or information exchange (RIE) to the second device; receiving a response from the second device indicating whether the RIE was accepted; and when the response indicates that the RIE is accepted: providing one or more selectable options for facilitating further communication with a user of the second device, where the further communication may be conducted electronically or in person; retrieving one or more talking points for use in facilitating the communication; and outputting the one or more talking points to the PND user.

Other functions performed by the PND/utility includes: triggering the PND to transmit a unique device signature (UDS) which identifies one or more of the PND and the PND user and which is capable of being detected within the real social/business environment; an encoding with the unique device signature data associated with one or more user preferences and/or one or more pre-set user criteria, which data represents social interaction information signal (SIS) of the PND user. The SIS determines a type/form of display of the UDS and what specific information is displayed in association with the UDS on selection of the UDS at a second device that receives the UDS. The PND further comprises: a transceiver capable of transmitting and receiving electronic communication via an air interface (wireless medium); and when the RIE response indicates approval of device-to-device electronic communication, the utility further performs the functions of: initiating one or more of: (a) localize text/signal information exchange (LTSE) protocol to enable the device-to-device electronic communication; and (b) activating a texting function of the PND to enable the device-to-device electronic communication via a texting service of a wireless data provider.

In one implementation, the PND further comprises: a local position system (LPS) device that enables a specific location of the PND within the real SoNET to be determined; and the utility performs the functions of: detecting one or more transmitter signals throughout the real SoNET; and mapping a general outlay of the real SoNET based on the received transmitter signals; where the transmitter signals contain specific information about the location at which the transmitter is situated within the SoNET; and where the identifying and plotting of locations of the PND and received signatures on the grid display is perform relative to the general outlay of the real SoNET; identifying the specific location of the PND on a grid display of the real SoNET; plotting on the grid display, relative to the PND's specific location, a current location of each signature received from other devices within the real SoNET; updating the grid display on a periodic schedule to track changes to the signatures being displayed and the location of the signatures relative to the specific location and to the real SoNET.

In one embodiment, the utility performs additional functions comprising: in response to receipt of an input to block communication from a specific signature: automatically disabling a selection of the signature for further communication; updating a blocked signature list with the specific signature; enabling selection of a period of time for which the block of the specific signature is to remain in place; and storing the selection along with the specific signature within the blocked signature list. Also, in response to receiving a block response to the RIE the utility performs the functions of: automatically disabling a selection of the specific signature on the PND; and updating a historical listing of signatures and corresponding responses received to RIEs transmitted to the signatures; when the PND is later re-activated within a SoNET and the specific signature is detected: automatically checking a status of a previous response received from the specific signature; and preventing a selection of the specific signature for transmitting and RIE when the previous response was a block; and updating the previous response to a non-block response based on one or more of: receipt of an RIE from the specific signature; receipt of an un-block signal from the specific signature; and expiration of a time period associated with the block that was established on the specific signature.

The utility further enables the functions of: receiving an RIE from a second device; detecting a selection of specific response to the RIE; transmitting the specific response selected to the second device, wherein the specific response selected is one of a number of pre-established responses comprising: (a) a block of the signature received from the second device, wherein the block is one of (i) a partial time-limited block, (ii) a specific SoNET block, and (c) a full, unrestricted block; and (b) an acceptance of the RIE with agreement to perform one or more available interchanges comprising (i) meet with the person, (ii) talk with the person, (iii) interact with the person is a predefined way, (iv) communicate verbally with the person, (vii) exchange contact information with the person, or (viii) engage in a text message communication with the person. In alternate implementations, the acceptance may comprise one or more of a time certain or a location for the interchange.

The PND further comprises a mechanism for connecting to a network having one or more servers with one or more online social networking profiles available for access and/or download; and the utility performs the functions of: enabling remote access to an online social networking profile at the one or more servers; receiving location information of a current SoNET in which the PND is located; selectively accessing a first online social networking profile of a plurality of online social networking profiles available for selection for the PND user based on the location information received; downloading to the PND a specific one of the online social networking profiles; and sharing one or more of the data within the online social networking profile via transmission of the SIS when the PND is in a publishing mode; and enabling real time updating of information stored in the online social networking profile based on inputs received and modifications made to data on the PND. Each of the plurality of online social networking profiles are associated with a specific type of SoNET and the selectively accessing and downloading of the first online social networking profile selects the online social networking profile that is associated with the current SoNET. The utility also enables a selective toggling of the PND from a publishing mode to a non-publishing mode based on one or more of: (a) default PND setting; (b) user modification of a publication mode option; (c) pre-established criteria for publishing SIS comprising one or more of (i) a specific SoNET in which the PND is located, (ii) a specific receiver or type of receiver of the SIS, (iii) a current status of the specific receiver within a historical listing.

The utility further performs screening functions comprising: when a signature is detected by the PND: retrieving an SIS associated with the signature; comparing the signature against a listing of signatures identified in a historical listing of signatures to determine if a specific treatment has been pre-established for handling subsequent receipt of the signature; when the signature is found within the listing of signatures, providing the specific treatment pre-established for that signature in response to detecting the signature; screening data from within the SIS against a pre-established set of screening data to determine if a specific treatment has been pre-established for handling receipt of SISes containing specific types of data; when the data meets a first pre-established criteria, performing a first positive function relative to the SIS and the signature; and when the data fails to meet the first pre-established criteria, performing a second function relative to the SIS and the signature.

Certain features of the described embodiments may be implemented or provided by existing service providers as a for-fee optional data plans and text plans. Specialized devices may be provided to patrons within a club, for free or for a fee, so that those patrons can then selectively interact with each other. For example, a clubs provides PNDs for a rental fee of $5 to patrons for use while in the club. The patrons then enter their information into the PND or insert their tingle chip into the devices serial port or download pre-entered information from the online or local social networking website (database). Alternatively, the person may have a tingle chip and simply insert the chip into the PND, enter their password to unlock the tingle chip and utilize the PND while at the club. A credit card hold or ID hold may be used to ensure return of the PND. Optionally, the PND may be provided only to VIPs or to a select group of patrons rather than be generally available.

One extension of the invention enables the tingle chip to be designed similarly to a subscriber identity module (SIM) card such that the tingle chip may be used as the second "SIM" in placed of an actual wireless communication card within a dual SIM device, as described within commonly owned and co-pending patent application Ser. No. 11/375,892, now U.S. Pat. No. 7,912,497, issued on Mar. 22, 2011.

Yet another embodiment provides for specialized tingle mingle service to patrons of the web site. For example, those patrons may be provided with "real time automatic tingle" when a match of certain criteria is detected from a person in the vicinity whose PND is one and transmitting specific information that enables filtering against the pre-set criteria.

One feature of the invention is the creation of TINGLE TEXT™, a language for use in a PND or tingle mingle device. This copyrighted language includes a combination of text and graphics that are available on the PND. An non-exhaustive list of example text includes: Chat ("let's chat—no mingle"), "BF" (boyfriend), Mx (Married), M×L (married but looking), mingled out—too many mingles, T, TB (tickle—tickle back), SHY (no mingle now, let's just chat), RuS (are you single), RuA (are you available), eyeglass (looking), dark shades (not looking), "shake" (do you want to dance?), LF (I like your friend); Name, # (what's your number), email, local, OT (out-of-town); glass (can I buy you a drink), CO (come over); NO (NO), Y (Yes).

The PND is able to connect to a background server via the internet using the PND and download user profile from web site/database in which the profiles are stored (tingle mingle-.com). Then once download, protect with a local code/password, so if PND is lost or stolen, no access to the user profile can be retrieved. As one other protection mechanism, a profile may be immediately erased after a period of non-use (e.g., request verification every 30 minutes) and/or if an incorrect unlock code is entered more than 3 times in sequence. With the later occurrence, the user would be required to provide a more advanced download and password credential check. In one embodiment, the PND may require entry of biometric information, such as a scan of the user's fingerprint (perhaps on an area of the touch screen) to activate the tingle profile. Only tingle appropriate profile data is permitted or allowed to be downloaded/viewed on the PND in order to prevent tampering and/or unauthorized use or access to personal information.

One extension of the invention allows for the monitoring and control of spending within establishments such as nightclubs, casinos, gentlemen's clubs and the like so that the patron has a preset cap/limit on how much money her/she will spend while out having fun or mingling. This, in one embodiment, the PND can be preprogrammed with a pre-set amount of spendable money. This pre-set amount may be set via the person's online account at the networking site, which may in turn be linked to their credit card account or even, with some additional securities, to the person's bank account. The networking site receives a request from the person to load $X.00 of spendable capital into the mingle account. The site confirms the availability of the funds, confirms that the amount requested falls within the pre-established limits for spending by the person, and once confirmed, the site enables transfer of the funds into a hold/mingle account associated with the online account. In one embodiment, the funds are directly linked to a particular establishment and different balances may be posted to different establishments. Thus, the person may transfer $200.00 to be used at Z Casino, $100.00 to be used at Y bar, and $75.00 to be used at a third entertainment establishment. With the amount(s) confirmed as available and not surpassing any caps established by the site or by the person when setting up the online account, the person then is provided access to the funds in the mingle account when the person visits the particular establishment linked to the funds or when the person goes out to mingle. Implementation of the above mingle account features enables the minglers to not have to worry about carry a credit card or cash when going out to specific locations. Once at the establishment, the person utilizes their PND with a specific fund retrieval device or system set up at the establishment to pay for their admission, drinks, and the like. Drinks may also be ordered by the person with funds stored within the PND (or accessible via the PND connection to the online account) using the PND to locate a lady across the bar to which the person wishes to send a tingle or at least send a drink as an open/overt invitation to mingle without having to approach the lady in person and offer the drink.

Also, some level of control is provided to the person with the source of funds who is desirous of directing the activities of the person using the funds. Thus, a parent may credit the account of her teenage daughter/son with money to be used at the gaming establishment the teenager indicated she/he was going to for the evening out with friends. By not giving the teenager cash or an open credit card to pay for himself/herself, there is less likelihood that the teenage will skip off to some other "not-to-be-disclosed" location with full access to the mother's funds to do with as the teenager wishes. Likewise, a wife of a known slot machine gambler may restrict the husband's access to funds while out with his buddies to only those specific bars that do not have slot machines.

There are many location-based services that are desirable to be provided to customers that connect to the Internet at various distributed locations. These services may include advertising, directions, special offers, content, communication aides, local payment, and similar services. The location-based services of the described embodiments rely on a PND enabled to communicate with a TINGLE MINGLE server (having location identification functionality and location content retrieval functionality) without requiring any interaction with an access control gateway. Thus, as provided by the above described embodiments, location specific information is provided to a PND independent of the ISP and the access control gateway. The embodiments provide a system and method that enables location based services to be provided at any location that has Internet access, regardless of the type or manner of access. The above description provides exemplary embodiments for implementing the novel features of the invention. Alternate embodiments are also possible, including variations of and modifications to the above described illustrative embodiments.

The flowcharts and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the flow charts above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A personal networking device (PND) comprising:
 a processor;
 a memory coupled to the processor;
 one or more input/output (I/O) devices that enables interaction with processes executing on the PND; and a utility executing on the processor that controls the operations of the PND to perform the functions of:
- receiving via an electronic medium an unique device signature (UDS) associated with a second device within a real social/business networking environment (real SoNET);
- displaying, on a user interface of the PND, a visual representation of the UDS at a location on the user interface that correlates to a physical location of the second device relative to a physical location of the PND;
- enabling selection at the PND of the visual representation of the UDS;
- responsive to a selection of the visual representation, triggering transmission, via short range wireless communication protocol, of a request for interaction and/or information exchange (RIE) to the second device wherein the request includes a first user profile that includes identifying information of at least one of the PND and a user of the PND as well as a location of the PND relative to the second device;
- receiving a response from the second device indicating whether the RIE was accepted and any conditions associated with the response; and
- in response to the response from the second device indicating that the RIE is accepted, providing one or more selectable menu options to a user of the PND to facilitate enabling the PND user to initiate further communication with a user of the second device, wherein said further communication may be conducted electronically or in person.

2. The PND of claim 1, wherein said utility further causes the PND to perform the functions of:
- associating a profile name and associated profile data of the first user profile with the UDS;
- encoding with the UDS the profile name and profile data corresponding to one or more user preferences and/or one or more pre-set user criteria, which data represents social interaction information signal (SIS) of the PND user;
- triggering the PND to transmit a the UDS which identifies one or more of the PND and a PND user and which is capable of being detected within the real SoNET; and
- wherein the SIS determines a type and form of display of the UDS and what specific information from the profile data is displayed at a second device in association with the UDS in response to a selection of the UDS at a second device that receives the UDS.

3. The PND of claim 1, further comprising:
- a transceiver capable of transmitting and receiving electronic communication via an air interface (wireless medium); and
- in response to the RIE response indicating approval of device-to-device electronic communication, said utility further configures the PND to initiate one or more of: (a) localize text/signal information exchange (LTSE) communication to enable the device-to-device electronic communication; and (b) a texting service supported by the PND to enable the device-to-device electronic communication via an SMS texting service of a wireless data provider.

4. The PND of claim 1, further comprising:
- a local position system (LPS) device that enables a specific location of the PND within the real SoNET to be determined; and
- the utility further causes the PND to perform the functions of:
  - identifying the specific location of the PND on a grid display representation of the real SoNET;
  - plotting on the grid display, relative to the PND's specific location, a current location of each UDS received from other devices within the real SoNET; and
  - updating the grid display on a periodic schedule to track changes to UDSes being displayed and the location of the UDSes relative to the specific location and to the real SoNET.

5. The PND of claim 4, said utility further causes the PND to perform the functions of:
- detecting one or more transmitter signals throughout the real SoNET; and
- mapping a general outlay of the real SoNET based on the received transmitter signals;
- wherein the transmitter signals contain specific information about the location at which a corresponding transmitter is situated within the SoNET; and
- wherein the identifying and plotting of locations of the PND and received UDSes on the grid display is perform relative to a general outlay of the real SoNET.

6. The PND of claim 1, wherein the utility causes the PND to perform additional functions comprising:
- in response to activation of a block sequence on the PND, displaying a drop down menu of selectable options related to handling of blocked signatures; and
- in response to receipt of a selection to block communication from a specific signature identified via one of (a) a corresponding visual representation on the user interface and (b) a profile identifier (ID) corresponding to the specific signature:
- automatically disabling a selection of the signature via the visual representation to prevent further communication from the device associate with that signature; and
- when the selection to block the communication occurs in response to a received RIE, transmitting a response that notifies a recipient device that a RIE received from the recipient device is denied and that the sender of the RIE is blocked from communication within the PND.

7. The PND of claim 1, wherein the utility causes the PND to perform additional functions comprising:
- in response to receiving a block response to the RIE:
  - automatically disabling a selection of the specific signature on the PND; and
  - updating a historical listing of signatures and corresponding responses received to RIEs transmitted to the signatures;
- in response to detection of the specific signature when the PND is later re-activated-within a SoNET:
  - automatically checking a status of a previous response received from the specific signature; and
  - preventing a selection of the specific signature for transmitting an RIE when the previous response was a block; and
- updating the previous response to a non-block response based on one or more of:
  - receipt of an RIE from the specific signature;
  - receipt of an un-block signal from the specific signature; and
  - expiration of a time period associated with the block that was established on the specific signature.

8. The PND of claim 1, wherein the utility further enables the PND to perform the functions of:
- receiving an RIE from a second device;
- detecting a selection of a specific response to the RIE from a menu list of selectable responses;

transmitting the specific response selected to the second device, wherein the specific response selected is one of a number of pre-established responses comprising:
  (a) a block of the signature received from the second device, wherein the block is one of (i) a partial time-limited block, (ii) a specific SoNET block, and (c) a full, unrestricted block; and
  (b) an acceptance of the RIE coupled with agreement to perform one or more available interchanges comprising (i) meet with the person, (ii) talk with the person, (iii) interact with the person in a predefined way, (iv) communicate verbally with the person, (vii) exchange contact information with the person, or (viii) engage in a text message communication with the person;
wherein the acceptance may comprise one or more of a time certain and/or a location for the interchange.

9. The PND of claim 1, further comprising:
a mechanism for connecting to a network having one or more servers with one or more online social networking profiles available for access and/or download; and
the utility causes the PND to perform the functions of:
  enabling remote access to an online social networking profile at the one or more servers;
  downloading to the PND a specific one of the online social networking profiles; and
  sharing one or more of the data within the online social networking profile via transmission of the SIS when the PND is in a publishing mode;
  wherein the utility enables a selective toggling of the PND from a publishing mode to a non-publishing mode based on one or more of: (a) default PND setting; (b) user modification of a publication mode option; (c) pre-established criteria for publishing SIS comprising one or more of (i) a specific SoNET in which the PND is located, (ii) a specific receiver or type of receiver of the SIS, (iii) a current status of the specific receiver within a historical listing.

10. The PND of claim 9, said utility causing the PND to perform additional functions comprising:
  receiving location information of a current SoNET in which the PND is located; and
  based on the location information received, selectively accessing and downloading profile data of a first online social networking profile from among a plurality of online social networking profiles available for selection for the PND user;
  wherein each of the plurality of online social networking profiles are associated with a specific type of SoNET and the selectively accessing and downloading of the first online social networking profile selects the online social networking profile that is associated with the current SoNET.

11. The PND of claim 9, the utility further causing the PND to perform functions comprising:
  enabling real time updating of information stored in the online social networking profile based on inputs received and modifications made to profile data on the PND.

12. The PND of claim 1, said utility further causing the PND to perform additional functions comprising:
  when a signature is detected by the PND:
    retrieving an SIS associated with the signature;
    comparing the signature against a listing of signatures identified in a historical listing of signatures to determine if a specific treatment has been pre-established for handling subsequent receipt of the signature;
    in response to finding the signature within the listing of signatures that have pre-established specific treatment assigned, providing the specific treatment pre-established for that signature;
  screening data from within the SIS against a pre-established set of screening data to determine if a specific treatment has been pre-established for handling receipt of SISes containing specific types of data;
  in response to the data meeting a first pre-established criteria, performing a first positive function relative to the SIS and the UDS; and
  in response to the data not meeting the first pre-established criteria, performing a second function relative to the SIS and the UDS.

13. The PND of claim 1, wherein said enabling selection of the visual representation of the UDS comprises:
  outputting the visual representation of the UDS for possible selection;
  receiving the selection via one of:
    (a) dynamically selecting the UDS based on a match of the profile data associated with the UDS to one or more pre-established criteria; and
    (b) receiving user toggling and selecting, via an input device, of the UDS from among one or more UDSes displayed on a display device of the PND.

14. The PND of claim 1, wherein the providing one or more selectable options for facilitating further communication with a user of the second device further comprises:
  retrieving one or more talking points for use by a user of the PND in facilitating the communication between the user of the PND and a user of the second device; and
  outputting the one or more talking points to the PND user.

15. In an electronic device having one or more mechanisms for communicating information with another device, a method for enabling real-time social and business networking, the method comprising:
  a processor of the electronic device executing a utility that performs the functions of:
    receiving via an electronic medium an unique device signature (UDS) associated with a second device within a real social/business networking environment (real SoNET);
    displaying, on a user interface of the PND, a visual representation of the UDS at a location on the user interface that correlates to a physical location of the second device relative to a physical location of the PND;
    enabling selection at the PND of the visual representation of the UDS;
    responsive to receipt of a selection of the visual representation, triggering transmission, via short range wireless communication protocol, of a request for interaction and/or information exchange (RIE) to the second device wherein the request includes a first user profile that includes identifying information of at least one of the PND and a user of the PND as well as a location of the PND relative to the second device;
    receiving a response from the second device indicating whether the RIE was accepted and any conditions associated with the response; and
    in response to the response from the second device indicating that the RIE is accepted, providing one or more selectable menu options to a user of the PND to facilitate enabling the PND user to initiate further communication with a user of the second device, wherein said further communication may be conducted electronically or in person;

retrieving one or more talking points for use by a user of the PND in facilitating the communication between the user of the PND and a user of the second device; and outputting the one or more talking points to the PND user.

16. The method of claim 15, further comprising:

associating a profile name and associated profile data of the first user profile with the UDS;

encoding with the UDS the profile name and profile data corresponding to one or more user preferences and/or one or more pre-set user criteria, which data represents social interaction information signal (SIS) of the PND user;

triggering the PND to transmit the UDS which identifies one or more of the PND and a PND user and which is capable of being detected within the real SoNET; and wherein the SIS determines a type and form of display of the UDS and what specific information from the profile data is displayed at a second device in association with the UDS in response to a selection of the UDS at a second device that receives the UDS.

17. The method of claim 15, wherein:

the electronic device comprises a transceiver capable of transmitting and receiving electronic communication via an air interface (wireless medium); and the method further comprises:

in response to the RIE response indicating approval of device-to-device electronic communication, initiating one or more of: (a) localize text/signal information exchange (LTSE) communication to enable the device-to-device electronic communication; and (b) a texting service supported by the PND to enable the device-to-device electronic communication via an SMS texting service of a wireless data provider.

18. The method of claim 15, wherein:

the electronic device further comprises a local position system (LPS) device that enables a specific location of the PND within the real SoNET to be determined; and the method further comprises:

detecting one or more transmitter signals throughout the real SoNET;

mapping a general outlay of the real SoNET based on the received transmitter signals, wherein the transmitter signals contain specific information about the location at which the transmitter is situated within the SoNET;

identifying the specific location of the PND on a grid display of the real SoNET;

plotting on the grid display, relative to the PND's specific location, a current location of each UDS received from other devices within the real SoNET, wherein the identifying and plotting of locations of the PND and received UDSes on the grid display is perform relative to the general outlay of the real SoNET; and updating the grid display on a periodic schedule to track changes to the UDSes being displayed and the location of the UDSes relative to the specific location and to the real SoNET.

19. The method of claim 15, further comprising:

in response to receiving a block response to the RIE:

automatically disabling a selection of the specific signature on the PND; and updating a historical listing of signatures and corresponding responses received to RIEs transmitted to the signatures;

in response to detection of the specific signature when the PND is later re-activated within a SoNET:

automatically checking a status of a previous response received from the specific signature; and preventing a selection of the specific signature for transmitting and RIE when the previous response was a block; and updating the previous response to a non-block response based on one or more of:

receipt of an RIE from the specific signature;

receipt of an un-block signal from the specific signature; and expiration of a time period associated with the block that was established on the specific signature.

20. The method of claim 15, further comprising:

receiving an RIE from a second device;

detecting selection of a reply option in response to the RIE;

transmitting the selected reply to the second device, wherein the selected reply is one of a number of pre-established responses comprising:

(a) a block of the signature received from the second device, wherein the block is one of (i) a partial time-limited block, (ii) a specific SoNET block, and (c) a full, unrestricted block; and (b) an acceptance of the RIE with agreement to perform one or more available interchanges comprising (i) meet with the person, (ii) talk with the person, (iii) interact with the person is a predefined way, (iv) communicate verbally with the person, (vii) exchange contact information with the person, or (viii) engage in a text message communication with the person;

wherein the acceptance may comprise one or more of a time certain or a location for the interchange.

21. The method of claim 15, wherein:

the electronic device comprises a mechanism for connecting to a network having one or more servers with one or more online social networking profiles available for access and/or download; and the method further comprises:

enabling remote access to an online social networking profile at the one or more servers;

receiving location information of a current SoNET in which the PND is located;

based on the location information received, selectively accessing a first online social networking profile of a plurality of online social networking profiles available for selection for the PND user;

wherein each of the plurality of online social networking profiles are associated with a specific type of SoNET and the selectively accessing and downloading of the first online social networking profile selects the online social networking profile that is associated with the current SoNET;

downloading to the PND the first online social networking profile; and sharing one or more of the data within the online social networking profile via transmission of the SIS when the PND is in a publishing mode;

wherein the utility enables a selective toggling of the PND from a publishing mode to a non-publishing mode based on one or more of: (a) default PND setting; (b) user modification of a publication mode option; (c) pre-established criteria for publishing SIS comprising one or more of (i) a specific SoNET in which the PND is located, (ii) a specific receiver or type of receiver of the SIS, (iii) a current status of the specific receiver within a historical listing; and enabling real time updating of information stored in the online social networking profile based on inputs received and modifications made to data on the PND.

22. The method of claim 15, further comprising:
when a signature is detected by the PND:
retrieving an SIS associated with the signature;
comparing the signature against a listing of signatures identified in a historical listing of signatures to determine if a specific treatment has been pre-established for handling subsequent receipt of the signature;
in response to finding the signature within the listing of signatures that have pre-established specific treatment assigned, providing the specific treatment pre-established for that signature;
screening data from within the SIS against a pre-established set of screening data to determine if a specific treatment has been pre-established for handling receipt of SISes containing specific types of data;
in response to the data meeting a first pre-established criteria, performing a first positive function relative to the SIS and the UDS; and
in response to the data not meeting the first pre-established criteria, performing a second function relative to the SIS and the UDS.

23. A computer program product comprising:
a computer readable device; and
program code on the computer readable device that when executed in an electronic device that includes a local position system (LPS) device, which enables a specific location of the device within a real social/business networking environment (SoNET) to be determined, the program code enables the device to perform the functions of:
triggering the device to transmit a unique device signature (UDS) which identifies one or more of the device and the device user and which is capable of being detected within the real SoNET; and
encoding with the unique device signature data associated with one or more user preferences and/or one or more pre-set user criteria, which data represents social interaction information signal (SIS) of the device user;
wherein the SIS determines a type and/or form of display of the UDS and what specific information is displayed in association with the UDS on selection of the UDS at a second device that receives the UDS;
receiving via an electronic medium a signature associated with a second device within a real SoNET;
identifying the specific location of the PND on a grid display of the real SoNET;
plotting on the grid display, relative to the PND's specific location, a current location of each signature received from other devices within the real SoNET;
updating the grid display on a periodic schedule to track changes to the signatures being displayed and the location of the signatures relative to the specific location and to the real SoNET;
detecting one or more transmitter signals throughout the real SoNET;
mapping a general outlay of the real SoNET based on the received transmitter signals;
wherein the transmitter signals contain specific information about the location at which the transmitter is situated within the SoNET;
wherein the identifying and plotting of locations of the PND and received signatures on the grid display is perform relative to the general outlay of the real SoNET;
when a signature is detected by the PND:
retrieving an SIS associated with the signature;
comparing the signature against a listing of signatures identified in a historical listing of signatures to determine if a specific treatment has been pre-established for handling subsequent receipt of the signature;
when the signature is found within the listing of signatures, providing the specific treatment pre-established for that signature in response to detecting the signature;
screening data from within the SIS against a pre-established set of screening data to determine if a specific treatment has been pre-established for handling receipt of SISes containing specific types of data;
when the data meets a first pre-established criteria, performing a first positive function relative to the SIS and the signature; and
when the data fails to meet the first pre-established criteria, performing a second function relative to the SIS and the signature;
enabling selection of the signature;
responsive to receipt of a selection of the signature, enabling transmission of a request for interaction and/or information exchange (RIE) to the second device;
receiving a response from the second device indicating whether the RIE was accepted;
when the response indicates that the RIE is accepted:
providing one or more selectable options for facilitating further communication with a user of the second device, wherein said further communication may be conducted electronically or in person;
retrieving one or more talking points for use in facilitating the communication; and
outputting the one or more talking points to the PND user; and
receiving an RIE from a second device;
detecting a selection of a specific response to the RIE;
transmitting the specific response selected to the second device, wherein the response selected is one of a number of pre-established responses comprising:
(a) a block of the signature received from the second device, wherein the block is one of (i) a partial time-limited block, (ii) a specific SoNET block, and (c) a full, unrestricted block; and
(b) an acceptance of the RIE with agreement to perform one or more available interchanges comprising (i) meet with the person, (ii) talk with the person, (iii) interact with the person is a predefined way, (iv) communicate verbally with the person, (vii) exchange contact information with the person, or (viii) engage in a text message communication with the person;
wherein the acceptance may comprise one or more of a time certain or a location for the interchange.

24. The computer program product of claim 23, wherein said utility comprises program code that performs additional functions comprising:
in response to receipt of an input to block communication from a specific signature:
automatically disabling a selection of the signature for further communication;
updating a blocked signature list with the specific signature;
enabling selection of a period of time for which the block of the specific signature is to remain in place; and
storing the selection along with the specific signature within the blocked signature list;
in response to receiving a block response to the RIE:

automatically disabling a selection of the specific signature on the PND; and updating a historical listing of signatures and corresponding responses received to RIEs transmitted to the signatures;

when the PND is later re-activated within a SoNET and the specific signature is detected:

automatically checking a status of a previous response received from the specific signature; and preventing a selection of the specific signature for transmitting and RIE when the previous response was a block; and updating the previous response to a non-block response based on one or more of:

receipt of an RIE from the specific signature;

receipt of an un-block signal from the specific signature; and expiration of a time period associated with the block that was established on the specific signature.

25. The computer program product of claim 23, wherein said utility comprises program code that performs additional functions comprising:

enabling remote access to an online social networking profile at one or more servers accessible via the electronic device;

receiving location information of a current SoNET in which the PND is located;

selectively accessing a first online social networking profile of a plurality of online social networking profiles available for selection for the PND user based on the location information received;

wherein each of the plurality of online social networking profiles are associated with a specific type of SoNET and the selectively accessing and downloading of the first online social networking profile selects the online social networking profile that is associated with the current SoNET;

downloading to the device the first online social networking profile;

sharing one or more of the data within the online social networking profile via transmission of the SIS when the PND is in a publishing mode;

wherein the utility enables a selective toggling of the PND from a publishing mode to a non-publishing mode based on one or more of: (a) default PND setting; (b) user modification of a publication mode option; (c) pre-established criteria for publishing SIS comprising one or more of (i) a specific SoNET in which the PND is located, (ii) a specific receiver or type of receiver of the SIS, (iii) a current status of the specific receiver within a historical listing; and enabling real time updating of information stored in the online social networking profile based on inputs received and modifications made to data on the PND.

26. The PND of claim 6, wherein the utility further causes the PND to perform the functions comprising:

updating a blocked signature list to include the specific signature corresponding to the input;

enabling selection of one or more criteria related to enforcement of the block of the specific signature; and storing the selected criteria along with the specific signature within the blocked signature list.

27. The PND of claim 21, wherein the one or more criteria selected includes a time period during which the specific signature remains inaccessible for selection from the PND, and the utility further causes the PND to perform the functions of:

detecting an expiration of the time period; and in response to detecting the expiration of the time period, automatically re-instate the specific signature such that the visual representation of the specific signature is presented on the user interface and is selectable.

28. The method of claim 15, further comprising:

in response to activation of a block sequence on the PND, displaying a drop down menu of selectable options related to handling of blocked signatures; and in response to receipt of a selection to block communication from a specific signature identified via one of (a) a corresponding visual representation on the user interface and (b) a profile identifier (ID) corresponding to the specific signature:

automatically disabling a selection of the signature via the visual representation to prevent further communication from the device associate with that signature;

updating a blocked signature list to include the specific signature corresponding to the input;

enabling selection of one or more criteria related to enforcement of the block of the specific signature;

storing the selected criteria along with the specific signature within the blocked signature list;

wherein when the one or more criteria selected includes a time period during which the specific signature remains inaccessible for selection from the PND, the method further comprises:

detecting an expiration of the time period; and in response to detecting the expiration of the time period, automatically re-instate the specific signature such that the visual representation of the specific signature is presented on the user interface and is selectable;

when the selection to block the communication occurs in response to a received RIE, transmitting a response that notifies a recipient device that a RIE received from the recipient device is denied and that the sender of the RIE is blocked from communication within the PND.

29. The PND of claim 1, wherein said enabling selection of the visual representation of the UDS comprises:

dynamically selecting the UDS based on a match of the profile data associated with the UDS to one or more pre-established criteria; and outputting the visual representation of the UDS for possible manual selection.

30. The PND of claim 14, wherein the one or more talking points are selected based on one or more of a plurality of criteria, from among: (a) the specific location and/or environment of the SoNET, including information about the specific environment and/or event being held at the SoNET; (b) known qualities of the PND user to promote active engagement, including topics of interest to at least one of the environment and the PND user; (c) profile information received about the person initiating the RIE; (d) pre-selected talking points of the PND user; (e) the profile of the PND user, for that SoNET; and (f) specific pre-identified goals of the PND user for being at the particular SoNET.

31. The PND of claim 14, wherein the one or more talking points are generated based on a real time evaluation that occurs at one or more of (a) the PND and (b) an online support site that is immediately accessible and programmed with a talking points generation engine.

* * * * *